(12) United States Patent
Aparin

(10) Patent No.: US 8,938,023 B2
(45) Date of Patent: Jan. 20, 2015

(54) ANALOG BASEBAND INTERFACE BETWEEN TRANSCEIVER AND MODEM

(71) Applicant: QUALCOMM Incorporated, San Diego, CA (US)

(72) Inventor: Vladimir Aparin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/828,574

(22) Filed: Mar. 14, 2013

(65) Prior Publication Data

US 2014/0269865 A1 Sep. 18, 2014

(51) Int. Cl.
*H04L 27/00* (2006.01)
*H04L 27/38* (2006.01)

(52) U.S. Cl.
CPC ............ *H04L 27/0002* (2013.01); *H04L 27/38* (2013.01)
USPC ........... 375/295; 375/267; 370/334; 455/326; 455/553.1

(58) Field of Classification Search
USPC ......................................... 375/222, 267, 295
See application file for complete search history.

(56) References Cited

U.S. PATENT DOCUMENTS

| | | | |
|---|---|---|---|
| 7,398,068 B2 | 7/2008 | Javor et al. | |
| 8,014,820 B2 | 9/2011 | Trachewsky et al. | |
| 8,139,670 B1 | 3/2012 | Son et al. | |
| 2007/0230403 A1* | 10/2007 | Douglas et al. | 370/334 |
| 2009/0081985 A1* | 3/2009 | Rofougaran et al. | 455/326 |
| 2010/0091688 A1 | 4/2010 | Staszewski et al. | |
| 2012/0001666 A1 | 1/2012 | Brown et al. | |
| 2012/0076229 A1 | 3/2012 | Brobston et al. | |
| 2012/0219085 A1* | 8/2012 | Long et al. | 375/295 |
| 2013/0287077 A1 | 10/2013 | Fernando et al. | |

FOREIGN PATENT DOCUMENTS

EP 2421174 A1 2/2012

OTHER PUBLICATIONS

International Search Report and Written Opinion—PCT/US2014/022809—ISA/EPO—Jul. 23, 2014.

\* cited by examiner

*Primary Examiner* — Leon-Viet Nguyen
(74) *Attorney, Agent, or Firm* — Fountainhead Law Group P.C.

(57) ABSTRACT

A wireless device for interfacing between a transceiver and a modem is described. The wireless device includes the transceiver. The transceiver generates a combined signal. The combined signal includes a first signal band from a first received signal and a second signal band from a second received signal at offset frequencies. The wireless device includes an analog baseband interface for providing the combined signal from the transceiver to the modem. The wireless device also includes the modem. The modem generates a downconverted/filtered signal for each of the signal bands of the combined signal.

49 Claims, 9 Drawing Sheets

ANALOG BASEBAND INTERFACE BETWEEN TRANSCEIVER AND MODEM

TECHNICAL FIELD

The present disclosure relates generally to wireless devices for communication systems. More specifically, the present disclosure relates to systems and methods for an analog baseband interface between a transceiver and a modem.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may transmit and receive signals wirelessly. In processing signals, electronic devices may use various filters, mixers, amplifiers, converters and other circuitry on the electronic device. Further, a signal may pass through various components on the electronic device, such as front end circuitry, transceivers and modems.

When processing multiple signals through an electronic device, interfacing between various components may present power and space issues. An electronic device may face limitations on the connections available for signal paths, as well as limitations on the speed at which signals are processed. Benefits may be realized by improvements to electronic devices that allows more effective interfacing between components on an electronic device.

SUMMARY

A wireless device for interfacing between a transceiver and a modem is described. The wireless device includes a transceiver. The transceiver generates a combined signal. The combined signal includes a first signal band from a first received signal and a second signal band from a second received signal at offset frequencies. The wireless device also includes an analog baseband interface that provides the combined signal from the transceiver to the modem. The wireless device also includes the modem. The modem generates a downconverted/filtered signal for each of the signal bands of the combined signal.

The transceiver and the modem may be configured to simultaneously process the first received signal and the second received signal along multiple receiver paths. The first received signal and the second received signal may be inphase/quadrature (I/Q) signals. A first downconverted/filtered signal may be generated by downconverting the combined signal to the baseband frequency for the first signal band. A second downconverted filtered signal may be generated by downconverting the combined signal to the baseband frequency for the second signal band.

The modem may convert a first downconverted/filtered signal from analog to digital using a first analog to digital converter (ADC). The modem may convert a second downconverted/filtered signal from analog to digital using a second analog to digital converter (ADC).

The transceiver may include a frequency divider with a different factor for each receiver path on the wireless device. The transceiver may generate an interface local oscillator (LO) signal. The interface local oscillator (LO) signal may be provided from the transceiver to the modem over the analog baseband interface. The combined signal and the interface local oscillator (LO) signal may be provided to the modem using three common pins via the analog baseband interface.

The interface local oscillator (LO) signal may be provided to a first transceiver upconverter on a first receiver path. The frequency of the interface local oscillator (LO) signal may be scaled by a first factor using a first frequency divider on the transceiver prior to being provided to the first transceiver upconverter. The interface local oscillator (LO) signal may be provided to a second transceiver upconverter on a second receiver path. The frequency of the interface local oscillator (LO) signal may be scaled by a second factor using a second frequency divider on the transceiver prior to being provided to the second transceiver upconverter.

The interface local oscillator (LO) signal may be provided to a first modem downconverter on a first receiver path. The frequency of the interface local oscillator (LO) signal may be scaled by a first factor using a first frequency divider on the modem prior to being provided to the first modem downconverter. The first factor may also be used for scaling the interface local oscillator (LO) signal on the first receiver path using a first frequency divider on the transceiver. The interface local oscillator (LO) signal may be provided to a second modem downconverter on a second receiver path. The interface local oscillator (LO) signal may be scaled by a second factor using a second frequency divider on the modem prior to being provided to the second modem downconverter. The second factor may also be used for scaling the interface local oscillator (LO) signal on the second receiver path using a second frequency divider on the transceiver. The modem may include a frequency divider with a different factor for each receiver path on the wireless device. Each factor of each frequency divider may correspond to a factor of a frequency divider for the receiver path on the transceiver.

A method for interfacing between a transceiver and a modem is also described. The method includes generating a combined signal. The combined signal includes a first signal band from a first received signal and a second signal band from a second received signal at offset frequencies. The method also includes providing the combined signal from the transceiver to the modem over an analog baseband interface. The method also includes generating a downconverted/filtered signal for each of the signal bands of the combined signal.

A computer-program product for interfacing between a transceiver and a modem is also described. The computer-program product includes a non-transitory computer-readable medium having instructions thereon. The instructions include code for causing a wireless device to generate a combined signal. The combined signal includes a first signal band from a first received signal and a second signal band from a second received signal at offset frequencies. The instructions also include code for causing the wireless device to provide the combined signal from the transceiver to the modem over an analog baseband interface. The instructions also include code for causing the wireless device to generate a downconverted/filtered signal for each of the signal bands of the combined signal.

An apparatus for interfacing between a transceiver and a modem is also described. The apparatus includes means for generating a combined signal. The combined signal includes a first signal band from a first received signal and a second signal band from a second received signal at offset frequencies. The apparatus also includes means for providing the combined signal from the transceiver to the modem. The apparatus also includes means for generating a downconverted/filtered signal for each of the signal bands of the combined signal.

DETAILED DESCRIPTION

Figure 1:
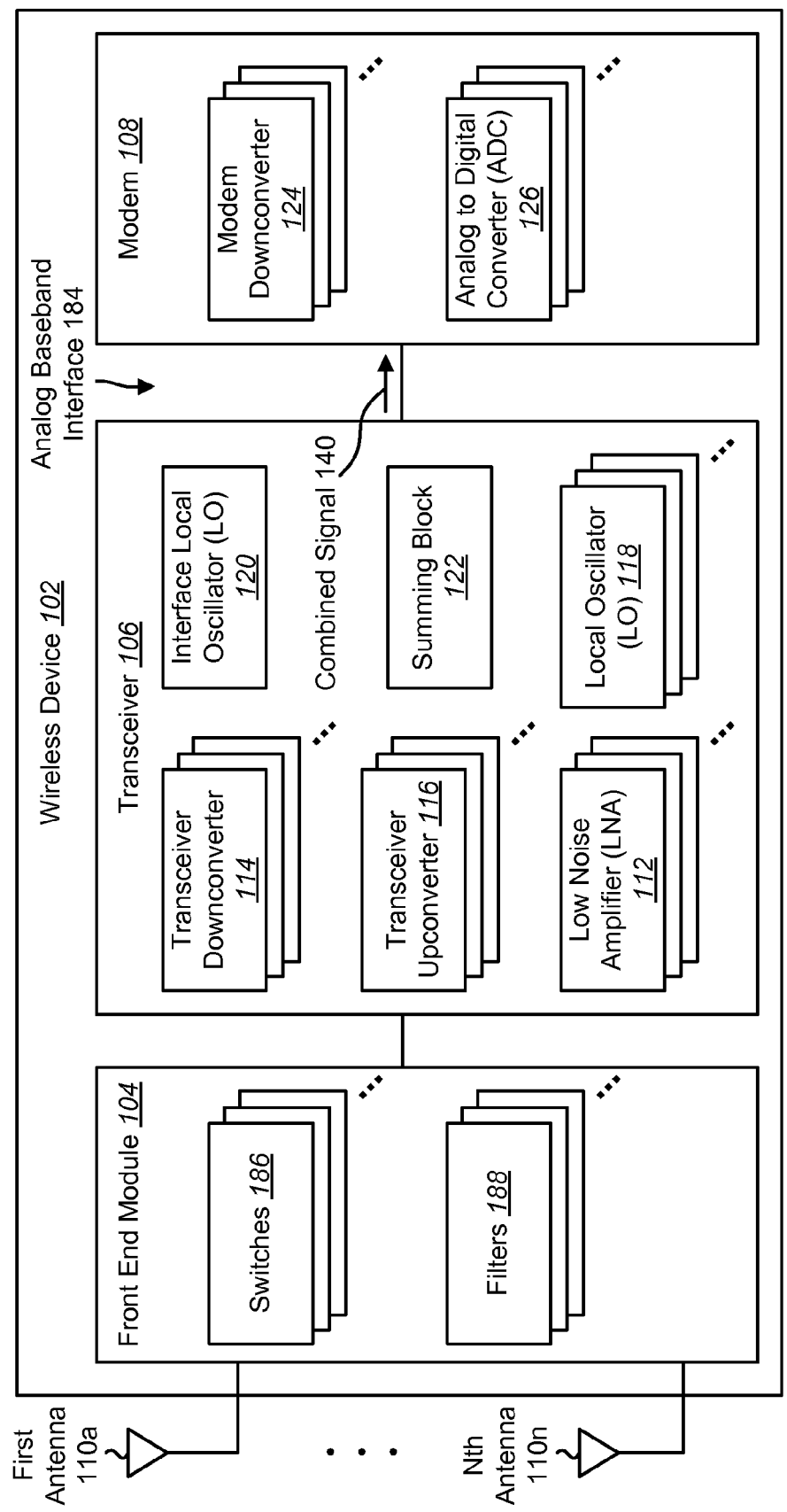
FIG. 1 is a block diagram illustrating one configuration of an analog baseband interface between a transceiver and a modem implemented on a wireless device.

FIG. 1 is a block diagram illustrating one configuration of an analog baseband interface 184 between a transceiver 106 and a modem 108 implemented on a wireless device 102. The wireless device 102 may be a base station or a wireless communication device. The wireless device 102 may include one or more antennas 110a-n for receiving signals. The signals may be processed along multiple receiver paths in the wireless device 102. The wireless device 102 may include a front end module 104, a transceiver 106 and a modem 108. The front end module 104, transceiver 106 and modem 108 may be used to simultaneously process multiple signals, including inphase (I) and quadrature (Q) components within each received signal. In one configuration, the transceiver 106 may combine multiple received signals into a combined signal 140 (e.g., a combined differential signal) that is provided to the modem 108. The modem 108 may separate the combined signal 140 along the respective receiver paths and convert each of the received signals from the analog domain to the digital domain using one or more analog to digital converters (ADCs) 126.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. A wireless communication device may communicate with zero, one or multiple base stations on a downlink and/or an uplink at any given moment. The downlink (or forward link) refers to the communication link from a base station to a wireless communication device, and the uplink (or reverse link) refers to the communication link from a wireless communication device to a base station. Uplink and downlink may refer to the communication link or to the carriers used for the communication link.

A wireless communication device may operate in a wireless communication system that includes other wireless devices, such as base stations. A base station is a station that communicates with one or more wireless communication devices. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3rd Generation Partnership Project (3GPP) Long Term Evolution (LTE) systems and spatial division multiple access (SDMA) systems.

The wireless device 102 may include one or more antennas 110. Each antenna 110 may receive one or more signals to be separately processed through dedicated receiver paths on the wireless device 102. In one configuration, the wireless device 102 may include up to eight receiver paths for processing eight signals received by one or more antennas 110 on the wireless device 102 (e.g., using eight antennas 110). In one example, the wireless device may include one antenna 110 for receiving multiple signals. Alternatively, the wireless device 102 may include an antenna 110 for each dedicated receiver path on the wireless device 102. In another configuration, the wireless device may include multiple antennas 110, each antenna being capable of receiving multiple signals to be processed by the wireless device 102.

Each of the receiver paths may include components in the front end module 104, the transceiver 106 and the modem 108. Further, signals from each receiver path may be combined into a combined signal 140 and provided from the transceiver 106 to the modem 108 over the analog baseband interface 184. Each receiver path may be configured to process each respective signal received by the one or more antennas 110 on the wireless device 102.

Each of the signals (e.g., received signals) processed on a receiver path of the wireless device 102 may be an inphase/quadrature (I/Q) signal. The inphase/quadrature (I/Q) signal may include a real component (referred to as the inphase (I) signal) and an imaginary component (referred to as the quadrature (Q) signal). As used herein, the inphase (I) signal may refer to both the inphase (I) signal and the inverse inphase (Ibar) signal while the quadrature (Q) signal may refer to both the quadrature (Q) signal and the inverse quadrature (Qbar) signal. Therefore, as used herein, a received signal or inphase/quadrature (I/Q) signal may refer collectively to the inphase (I) signal, the quadrature (Q) signal, the inverse inphase signal (Ibar) and the inverse quadrature (Qbar) signal. Each of the signals within the inphase/quadrature (I/Q) signal may represent different phase shifts of the inphase/quadrature (I/Q) signal. Each receiver path may be configured to process a different inphase/quadrature (I/Q) signal, including each of the signals within the inphase/quadrature (I/Q) signal.

Each antenna 110 may be coupled to a front end module 104. The front end module 104 may include switches 186 and filters 188. In one configuration, the front end module 104 may include one or more switches 186 and one or more filters 188 for each receiver path. The switches 186 and filters 188 may be used to filter or otherwise process one or more signals received by each antenna 110 and prepare each signal to be provided to a transceiver 106. The front end module 104 may be coupled to the transceiver 106.

The transceiver 106 may be a radio frequency (RF) transceiver 106. The transceiver 106 may include various components for processing a received signal obtained from the front end module 104. Examples of components that may be included in the transceiver 106 include low noise amplifiers (LNAs) 112, transceiver downconverters 114, transceiver upconverters 116, one or more local oscillators (LOs) 118, an interface local oscillator (LO) 120 and a summing block 122. The transceiver 106 may also include additional components (e.g., baseband filters, frequency dividers) for processing a received signal. Each receiver path may include multiple components in the transceiver 106 for simultaneously processing multiple received signals. For example, for each receiver path on the wireless device 102, the transceiver 106 may include one or more low noise amplifiers (LNAs) 112, transceiver downconverters 114 and transceiver upconverters 116. Further, each receiver path may include one or more local oscillators (LOs) 118, baseband filters, frequency dividers and other components for processing a received signal. The transceiver 106 may be coupled to the modem 108 via the analog baseband interface 184.

The modem 108 may receive one or more signals from the transceiver 106 over the analog baseband interface 184. The modem 108 may include multiple modem downconverters 124 and analog to digital converters (ADCs) 126. Similar to the front end module 104 and the transceiver 106, the modem 108 may be configured to simultaneously process signals passing through the wireless device 102 on multiple receiver paths. Each receiver path may include multiple modem downconverters 124 and one or more analog to digital converters (ADC) 126 on the modem 108.

In processing a signal along a receiver path, the wireless device 102 may receive one or more signals from a first antenna 110. In some configurations, the wireless device 102 may receive multiple signals at multiple antennas 110a-n. Each of the antennas 110a-n may receive one or more signals and provide the signals to the front end module 104. The front end module 104 may filter the signals from the antennas 110 using one or more switches 186 and/or filters 188. The front end module 104 may provide the amplified received signals to the transceiver 106.

The transceiver 106 may receive the amplified received signals from the front end module 104. In some configurations, the transceiver 106 may receive one or more received signals for each antenna 110 on the wireless device 102. The transceiver 106 may provide additional processing for each of the received signals along the corresponding receiver paths on the wireless device 102. The transceiver 106 may include one or more low noise amplifiers (LNAs) 112 for amplifying each received signal. Further, the transceiver 106 may downconvert a received signal using a transceiver downconverter 114. The transceiver downconverter 114 may be used for downconverting a received signal to a baseband frequency. The transceiver downconverter 114 may downconvert the received signal based on the frequency of a local oscillator (LO) signal provided by a local oscillator (LO) 118. The transceiver downconverter 114 may output a downconverted signal at the baseband frequency. As used herein, the downconverted signal may also be referred to as a baseband signal or a received signal at a baseband frequency.

The transceiver 106 may interface with a modem 108 on the wireless device 102. Interfacing with the modem 108 may include the transceiver 106 preparing a downconverted signal to be provided from the transceiver 106 to the modem 108. Interfacing between the transceiver 106 and the modem 108 may also include the modem 108 obtaining a signal from the transceiver 106 and preparing the signal to be converted from the analog domain to the digital domain. Interfacing between the transceiver 106 and the modem 108 may utilize components on both the transceiver 106 and the modem 108, as well as components (e.g., pins, connections, circuitry) involved in the interaction that occurs between the transceiver 106 and the modem 108. In one example, when interfacing between the transceiver 106 and the modem 108, the wireless device 102 may use one or more transceiver upconverters 116, an interface local oscillator (LO) 120 and a summing block 122 on the transceiver 106. The wireless device 102 may also use one or more modem downconverters 124 on the modem 108.

In preparing a signal to interface with the modem 108, the modem 108 may use one or more transceiver upconverters 116 (on the transceiver 106) to generate a combined signal 140 with signal bands at offset frequencies. This may be performed by upconverting some or all of the received signals on each of the receiver paths. In generating the combined signal 140, a downconverted signal from a transceiver downconverter 114 may be provided to a transceiver upconverter 116. The downconverted signal may be upconverted using the transceiver upconverter 116. The transceiver upconverter 116 may upconvert the signal based on the frequency of an interface local oscillator (LO) signal. The frequency of the interface local oscillator (LO) signal may include a range of frequencies, including frequencies within the high frequency (HF) radio frequency range and ultra high frequency (UHF) radio frequency range. The interface local oscillator (LO) signal may be provided from an interface local oscillator (LO) 120 to the transceiver upconverter 116. The frequency of the interface local oscillator (LO) signal may be different for each receiver path on the wireless device 102. For example, a transceiver upconverter 116 corresponding to a first receiver path may upconvert a signal based on a first frequency while a transceiver upconverter 116 corresponding to a second receiver path may upconvert a signal based on a second frequency. In another configuration, a first received signal may skip upconversion and remain at the baseband frequency while a second received signal is upconverted using a transceiver upconverter 116. The first frequency and second frequency may be offset along the frequency spectrum such that their spectra are not overlapping. Each of the transceiver upconverters 116 may output an upconverted signal at a different frequency for each receiver path.

Each of the upconverted signals from each receiver path may be provided to a summing block 122. The summing block 122 may receive the upconverted signals from each transceiver upconverter 116 on each of the receiver paths of the wireless device 102. The summing block 122 may combine each upconverted signal to obtain the combined signal 140. The combined signal 140 may include signal bands from each of the upconverted signals provided to the summing block 122. Because each of the upconverted signals are at offset frequencies, the combined signal 140 may include information from each of the upconverted signals corresponding to each receiver path in a single combined signal 140. Each upconverted signal may be offset along the frequency spectrum such that none of the signal bands from different received signals are overlapping along the frequency spectrum. As an example, in a wireless device 102 with three receiver paths, the combined signal 140 may include three signal bands offset along a frequency range of 3-300 megahertz (MHz). Each signal band within the combined signal 140 may correspond to a different baseband signal upconverted to a different intermediate frequency. The combined signal 140 may include more or less signal bands along the frequency spectrum, depending on the number of receiver paths on the wireless device 102.

The combined signal 140 may be provided to the modem 108. The modem 108 may include multiple receiver paths for processing each of the signal bands of the combined signal 140. The combined signal 140 may be provided to modem downconverters 124 corresponding to each of the receiver paths. The modem downconverters 124 may downconvert the combined signal 140 to obtain a downconverted signal for each receiver path. In some configurations, the combined signal 140 may optionally be amplified prior to being provided to each modem downconverter 124.

Each of the modem downconverters 124 may downconvert the combined signal 140 using a frequency from the interface local oscillator (LO) 120. The frequency from the interface local oscillator (LO) 120 on the transceiver 106 may be provided to the modem downconverters 124 on the modem 108 via the analog baseband interface 184. In another configuration, the interface local oscillator (LO) 120 may be included on the modem 108 and provided to the transceiver 106. In another configuration, the transceiver 106 and the modem 108 may each include local oscillator (LO) circuits, which are programmed to the same frequency. The frequency of the interface local oscillator (LO) signal provided to each modem downconverter 124 on each receiver path may correspond to the same frequency as the interface local oscillator (LO) signal provided to each transceiver upconverter 116 on corresponding receiver paths. By providing the interface local oscillator (LO) signal for each receiver path, each portion of the combined signal 140 corresponding to each upconverted signal may be downconverted to the baseband frequency on different receiver paths. Each portion of the combined signal 140 may be present in each of the downconverted signals at different carrier frequencies. The separation of each of the downconverted signals may be performed by a baseband filter after each downconverter. Each baseband filter may preserve the downconverted signal (i.e., the signal with a 0 hertz (Hz) carrier frequency) and attenuates the signals at other carrier frequencies.

In one example, if the frequency of an interface local oscillator (LO) signal provided to a transceiver upconverter 116 on a first receiver path is 100 megahertz (MHz), the frequency of the interface local oscillator (LO) signal provided to a modem downconverter 124 on the first receiver path may also be 100 MHz. Therefore, the modem downconverter 124 on the first receiver path may downconvert the portion of the combined signal 140 corresponding to the upconverted signal on the first receiver path to a baseband frequency. Each of the modem downconverters 124 may downconvert the combined signal 140 according to a different frequency of an interface local oscillator (LO) signal provided to different receiver paths.

After interfacing with the transceiver 106, the modem 108 may convert each of the downconverted and filtered signals using one or more analog to digital converters (ADCs) 126 for each receiver path. The analog to digital converters (ADCs) 126 may convert each downconverted and filtered signal from the analog domain to the digital domain to produce a converted signal for each receiver path. Further, each analog to digital converter (ADC) 126 may be configured to receive a downconverted and filtered signal, including the inphase (I) and quadrature (Q) components of an inphase/quadrature (I/Q) signal and output a single digital signal. The analog to digital converter (ADC) 126 may output a converted signal for each receiver path and provide the converted signal to other components on the wireless device 102.

By using an analog baseband interface 184, the transceiver 106 and the modem 108 may interface at relatively high speeds while consuming less power and without using complex digital circuitry. For example, when interfacing using digital circuitry, a clock signal may need to operate at increasingly high frequencies in order for a wireless device 102 to simultaneously process multiple signals. In contrast, by interfacing using an analog baseband interface 184, the transceiver 106 and the modem 108 may interface by combining multiple signal bands within a combined signal 140 spanning across a relatively low range of frequencies (e.g., 3-300 MHz). In one configuration, each of the signal bands of the combined signal 140 may be included within a range of 300 MHz or less, consuming relatively low power when compared to a clock signal in a digital circuit having a much higher frequency. Further, when processing additional received signals along additional receiver paths, the frequency of the interface local oscillator (LO) signal may be increased by a relatively small amount to accommodate any additional signal bands on the combined signal 140. Therefore, additional received signals may be processed simultaneously without a substantial increase in the power consumption of the wireless device 102.

Further, by combining multiple upconverted signals into a combined signal 140 when interfacing between the transceiver 106 and the modem 108, the transceiver 106 and the modem 108 may simultaneously process signals along multiple receiver paths using fewer pins on the transceiver 106 and the modem 108. For example, instead of using a different pin or multiple pins for each signal of each receiver path, the analog baseband interface 184 may combine multiple upconverted signals into a single combined signal 140 and provide the combined signal 140 from the transceiver 106 to the modem 108 using fewer pins or connections than would be used via other interfaces. In one configuration, eight receiver paths may be processed simultaneously by combining each of the eight upconverted signals of each receiver path into a single combined signal 140. The combined signal 140 may then be transferred between the transceiver 106 and the modem 108 using a fraction of the pins on the transceiver 106 and the modem 108 that would otherwise be used when individually transferring signals between the transceiver 106 and the modem 108.

Figure 2:
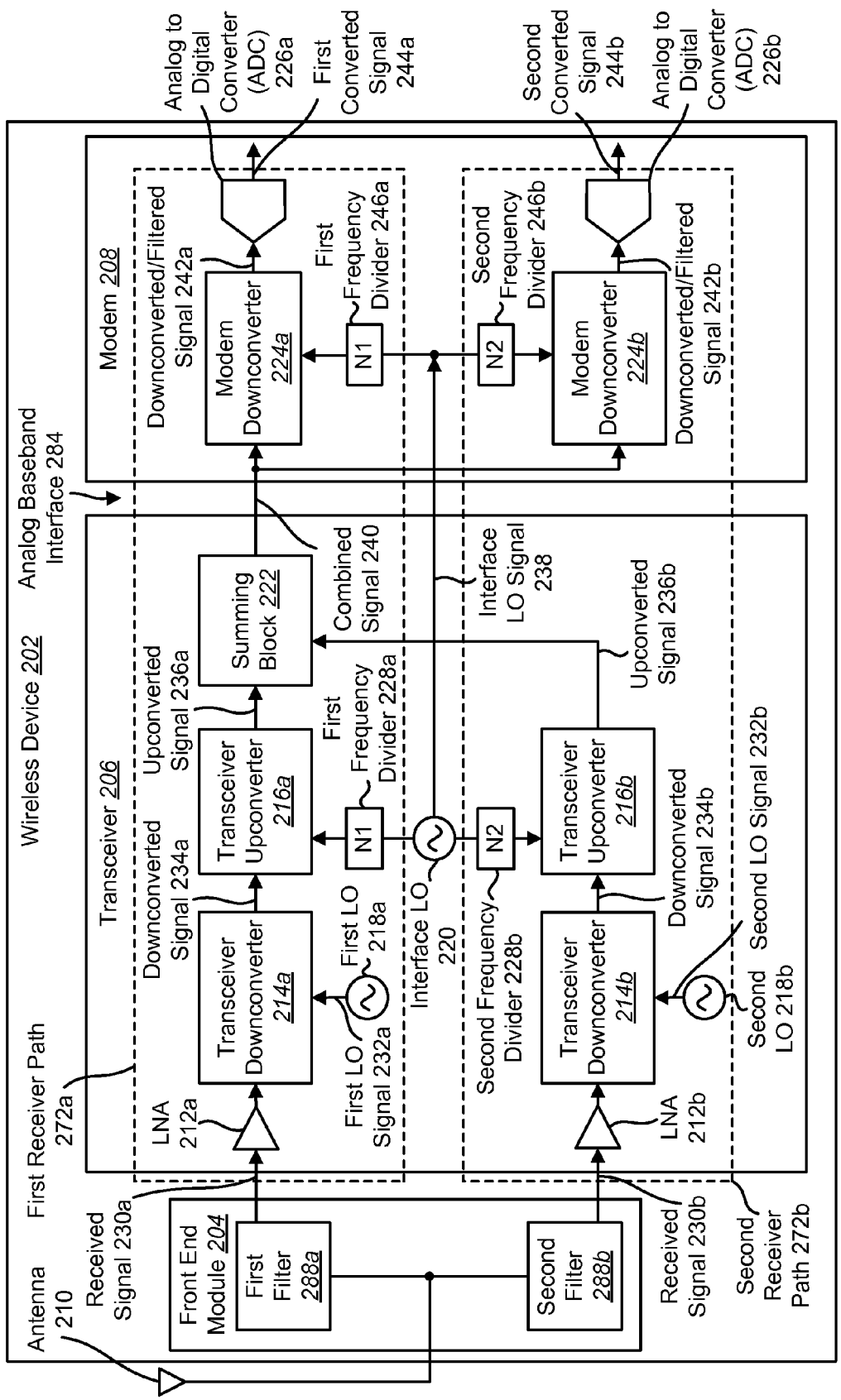
FIG. 2 is a block diagram illustrating a more detailed configuration of an analog baseband interface between a transceiver and a modem implemented on a wireless device.

FIG. 2 is a block diagram illustrating a more detailed configuration of an analog baseband interface 284 between a transceiver 206 and a modem 208 implemented on a wireless device 202. The analog baseband interface 284 may be one configuration of the analog baseband interface 184 described above in connection with FIG. 1. The wireless device 202 may include a single antenna corresponding to two receiver paths 272*a-b* through the wireless device 202. Other configurations may include additional antennas 210 corresponding to one or more additional receiver paths 272. The wireless device 202 may receive a first signal and a second signal from the antenna 210.

The antenna 210 may be coupled to a front end module 204. The front end module 204 may process each of the signals received by the antenna 210 using one or more filters 288 and provide a first received signal 230*a* and a second received signal 230*b* to the transceiver 206. In one configuration, the front end module 204 may include two filters 288*a-b*, one for each receiver path 272. The front end module 204 may also include one or more switches and other circuitry. The first received signal 230*a* may be provided to the transceiver 206 on a first receiver path 272*a* and the second received signal 230*b* may be provided to the transceiver 206 on a second receiver path 272*b*.

The first received signal 230*a* may be provided to a first low noise amplifier (LNA) 212*a* on the first receiver path 272*a*. The first low noise amplifier (LNA) 212*a* may amplify the first received signal 230*a* and provide an amplified received signal 230*a* to a transceiver downconverter 214*a* on the first receiver path 272*a*. The second received signal 230*b* may be provided to a second low noise amplifier (LNA) 212*b* on the second receiver path 272*b*. The second low noise amplifier (LNA) 212*b* may amplify the second received signal 230*b* and provide an amplified received signal 230*b* to a transceiver downconverter 214*b* on the second receiver path 272*b*. The first transceiver downconverter 214*a* may downconvert the first received signal 230*a* according to the frequency of a first local oscillator (LO) signal 232*a*. The first local oscillator (LO) signal 232*a* may be provided by a first local oscillator (LO) 218*a* on the transceiver 206. The second transceiver downconverter 214*b* may downconvert the second received signal 230*b* according to the frequency of a second local oscillator (LO) signal 232*b*. The second local oscillator (LO) signal 232*b* may be provided by a second local oscillator (LO) 218*b* on the transceiver 206. In configurations with additional receiver paths 272, the transceiver 206 may include a local oscillator (LO) 218 for each receiver path 272. Each of the transceiver downconverters 214 may output a downconverted signal 234.

Some or all of the downconverted signals 234 may be upconverted using one or more transceiver upconverters 216 on the transceiver 206. For example, a first downconverted signal 234*a* may be provided to a first transceiver upconverter 216*a*. The first transceiver upconverter 216*a* may upconvert the first downconverted signal 234*a* based on a frequency of an interface local oscillator (LO) signal 238 to obtain a first upconverted signal 236*a*. The interface local oscillator (LO) signal 238 may be generated by an interface local oscillator (LO) 220. The frequency of the interface local oscillator (LO) signal 238 may be reduced (by a factor of N1) by a first frequency divider 228*a* before being provided to the first transceiver upconverter 216*a*. The frequency of the interface local oscillator (LO) signal 238 may also be reduced (by a factor of N2) by a second frequency divider 228*b* before being provided to a second transceiver upconverter 216*b*.

A second downconverted signal 234*b* may be provided to the second transceiver upconverter 216*b*. The second transceiver upconverter 216*b* may upconvert the second downconverted signal 234*b* based on the interface local oscillator (LO) signal 238 (via the second frequency divider 228*b*) to obtain a second upconverted signal 236*b*.

Each of the frequency dividers 228 may be used to generate a frequency that is scaled from the frequency of the interface local oscillator (LO) signal 238. By scaling the frequency of the interface local oscillator (LO) signal 238, the frequency of the interface local oscillator (LO) signal 238 provided to the first transceiver upconverter 216*a* on the first receiver path 272*a* may be different than the frequency of the interface local oscillator (LO) signal 238 provided to the second transceiver upconverter 216*b* on the second receiver path 272*b*. The transceiver 206 may include a different frequency divider 228 for each of the receiver paths 272 to generate upconverted signals 236 at a different frequency for each receiver path 272. The frequency dividers 228 may also be used to produce in-phase (I) and quadrature (Q) local oscillator (LO) signals.

The upconverted signals 236 from each of the receiver paths 272 may include multiple signals with signal bands at offset frequencies such that their spectra are not overlapping. In some configurations, one signal band may remain at the baseband frequency without being upconverted by a transceiver upconverter 216. In other words, one receiver path 272 may obtain an upconverted signal 236 without using a transceiver upconverter 216. Therefore, when collectively referring to the upconverted signals 236 from each receiver path 272, one of the signals may refer to a downconverted signal 234 on one receiver path 272 that remains at the baseband frequency without being upconverted by a transceiver upconverter 216.

Each of the upconverted signals 236 may be provided to a summing block 222. In one example, a first upconverted signal 236*a* and a second upconverted signal 236*b* are combined using the summing block 222 to obtain a combined signal 240. The combined signal 240 may include a signal band from the first upconverted signal 236*a* and a signal band from the second upconverted signal 236*b*. Because the first upconverted signal 236*a* and the second upconverted signal 236*b* include signal bands having offset frequencies, the multiple signal bands in the combined signal 240 may be offset along the frequency spectrum. In configurations where additional receiver paths 272 are used, the combined signal 240 may include additional signal bands corresponding to additional upconverted signals 236 offset along the frequency spectrum.

The combined signal 240 may be provided from the transceiver 206 to the modem 208 via the analog baseband interface 284. The modem 208 may include components on multiple receiver paths 272 for processing each of the signal bands of the combined signal 240. In one configuration, the combined signal 240 may be provided to a first modem downconverter 224*a* and a second modem downconverter 224*b*. The first modem downconverter 224*a* may downconvert the combined signal 240 based on a frequency of the interface local oscillator (LO) signal 238 provided to the first modem downconverter 224*a* (via the analog baseband interface 284 and a first frequency divider N1 246*a*). The first modem downconverter 224*a* may output a first downconverted/filtered signal 242*a*.

The second modem downconverter 224*b* may downconvert the combined signal 240 based on a frequency of the interface local oscillator (LO) signal 238 provided to the second modem downconverter 224b (via the analog baseband interface 284 and a second frequency divider N2 246b). The second modem downconverter 224b may output a second downconverted/filtered signal 242b. In some configurations, where the combined signal 240 includes one signal band at the baseband frequency, one of the receiver paths 272 may obtain a downconverted/filtered signal 242 without using a modem downconverter 224. Therefore, one of the receiver paths 272 may skip the use of a modem downconverter 224 when processing the combined signal 240 along one of the receiver paths 272.

The first frequency divider 246a may be used to scale the frequency of the interface local oscillator (LO) signal 238 (by a factor of N1) provided to the first modem downconverter 224a. The first frequency divider 246a on the modem 208 may scale the frequency of the interface local oscillator (LO) signal 238 using the same factor as the first frequency divider 228a on the transceiver 206. The second frequency divider 246b may also scale the frequency of the interface local oscillator (LO) signal 238 (by a factor of N2) provided to the second modem downconverter 224b. The second frequency divider 246b on the modem 208 may scale the frequency of the interface local oscillator (LO) signal 238 using the same factor as the second frequency divider 228b on the transceiver 206. The frequency dividers 246 may also be used to produce in-phase (I) and quadrature-phase (Q) local oscillator (LO) signals.

The modem 208 may include a different frequency divider 246 for each of the receiver paths 272. Each of the frequency dividers 246 on the modem 208 may scale the frequency of the interface local oscillator (LO) signal 238 using the same scaling factor as the corresponding frequency dividers 228 on the transceiver 206. Therefore, the frequency of the interface local oscillator (LO) signal 238 provided to each of the modem downconverters 224a-b on different receiver paths 272a-b may correspond to the frequency of the interface local oscillator (LO) signal 238 provided to different transceiver upconverters 216a-b on corresponding receiver paths 272a-b.

Each downconverted/filtered signal 242a-b may include a signal band centered around the baseband frequency, with the additional signal bands included within the combined signal 240 offset from the baseband. The signal band centered around the baseband frequency may correspond to the signal band of the upconverted signal 236 for the corresponding receiver path 272. For example, the signal band at the baseband frequency of a first downconverted/filtered signal 242a may correspond to a signal band from the first upconverted signal 236a on the first receiver path 272a. Additionally, each of the baseband signal bands for each of the downconverted/filtered signals 242a-b may correspond to the signal band of each of the upconverted signals 236a-b on corresponding receiver paths 272. For each downconverted/filtered signal 242a-b, the modem 208 may discard or filter out any non-baseband signals when converting the downconverted/filtered signal 242 from the analog domain to the digital domain. The combined signal 240 may be present in each of the downconverted/filtered signals 242 at different carrier frequencies. The separation of each of the downconverted signals may be performed by a baseband filter after each downconverter. Each baseband filter may preserve the downconverted signal with a 0 Hz carrier frequency and attenuate the signals at other carrier frequencies.

Each of the downconverted/filtered signals 242 may be provided to one or more analog to digital converters (ADCs) 226a-b to be converted from the analog domain to the digital domain. Each receiver path 272 may include one or more analog to digital converters (ADC) 226 for converting each of the signals passing through the wireless device 102. In one example, the first downconverted/filtered signal 242a may be provided to a first analog to digital converter (ADC) 226a. The second downconverted/filtered signal 242b may be provided to a second analog to digital converter (ADC) 226b. The first analog to digital converter (ADC) 226a may output a first converted signal 244a. The second analog to digital converter (ADC) 226b may output a second converted signal 244b. Each analog to digital converter (ADC) 226 may be configured to receive a downconverted/filtered signal 242 that includes the inphase (I) and quadrature (Q) components.

Figure 3:
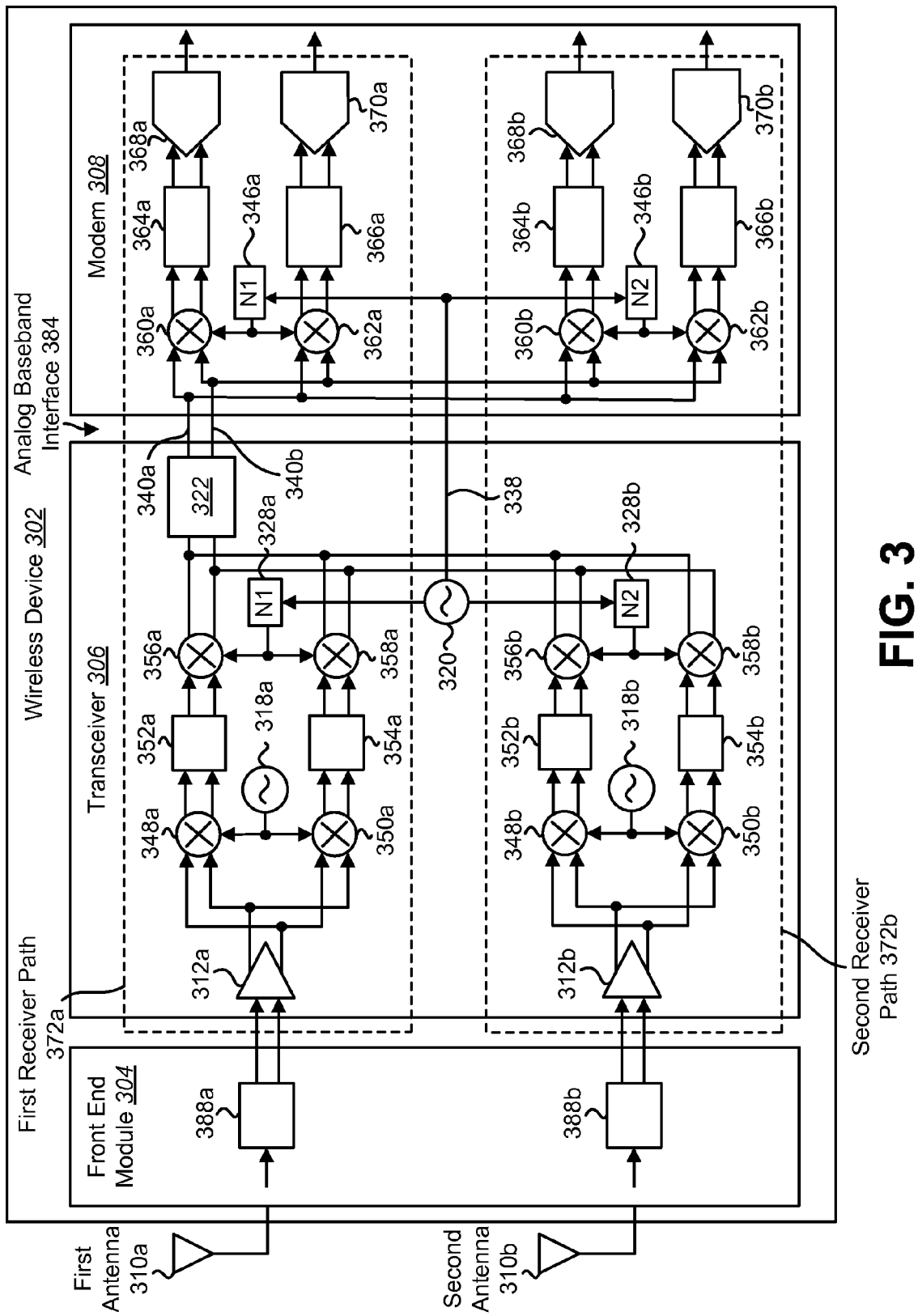
FIG. 3 is a block diagram illustrating another more detailed configuration of an analog baseband interface between a transceiver and a modem implemented on a wireless device.

FIG. 3 is a block diagram illustrating another more detailed configuration of an analog baseband interface 384 between a transceiver 306 and a modem 308 implemented on a wireless device 302. The analog baseband interface 384 may be one configuration of the analog baseband interface 184 described above in connection with FIG. 1. The wireless device 302 may include two antennas 310a-b corresponding to two receiver paths 372a-b through the wireless device 302. Other configurations may include fewer or additional antennas 310 for receiving one or more signals, each to be processed along one or more additional receiver paths 372. In one example, the wireless device 302 may receive a first signal using the first antenna 310a and a second signal using the second antenna 310b.

The signals from the first antenna 310a and the second antenna 310b may be provided to the front end module 304. Each of the signals received by the antennas 310a-b may be processed by various components within the front end module 304. For example, the front end module 304 may include filters 388a-b for filtering signals provided for each receiver path 372. The signals provided by the antennas 310 may be divided into inphase (I) and quadrature (Q) components by the filters 388 or other circuitry on the front end module 304. The signals from the antennas 310 may be provided to a transceiver 306 on the wireless device 302.

Each received signal provided from the front end module 304 to the transceiver 306 may include an inphase (I) component and a quadrature (Q) component. As used herein, the received signal provided to the transceiver 306 may be referred to as a received inphase/quadrature (I/Q) signal. The received inphase/quadrature (I/Q) signal may include an inphase (I) signal, an inverse inphase (Ibar) signal, a quadrature signal (Q) and an inverse quadrature (Qbar) signal. Further, as used herein, the inphase (I) signal may refer to both the inphase (I) signal and the inverse inphase (Ibar) signal while the quadrature (Q) signal may refer to both the quadrature (Q) signal and the inverse quadrature (Qbar) signal. Each of the signals within the received inphase/quadrature (I/Q) signal may represent different phase shifts of the received inphase/quadrature (I/Q) signal. In one example, a first received inphase/quadrature (I/Q) signal is processed along the first receiver path 372a while a second received inphase/quadrature (I/Q) signal is processed along the second receiver path 372b.

Each of the receiver paths 372 may include a low noise amplifier (LNA) 312. For example, a first receiver path 372a may include a first low noise amplifier (LNA) 312a for amplifying a received signal along the first receiver path 372a. A second receiver path 372b may include a second low noise amplifier (LNA) 312b for amplifying a received signal along the second receiver path 372b. Each of the receiver paths 372 may also include one or more transceiver downconverters 348a-b, 350a-b. For example, the first receiver path 372a may include a first transceiver downconverter 348a and a second transceiver downconverter 350a. The second receiver path 372b may also include a first transceiver downconverter 348b and a second transceiver downconverter 350b. The transceiver downconverters 348a, 350a on the first receiver path 372a may downconvert a first received inphase/quadrature (I/Q) signal according to the frequency of a first local oscillator (LO) signal to produce a first downconverted inphase/quadrature (I/Q) signal. The first local oscillator (LO) signal may be provided from a first local oscillator (LO) 318a on the first receiver path 372a. The transceiver downconverters 348b, 350b on the second receiver path 372b may downconvert a second received inphase/quadrature (I/Q) signal according to the frequency of a second local oscillator (LO) signal to produce a second downconverter inphase/quadrature (I/Q) signal. The second local oscillator (LO) signal may be provided from a second local oscillator (LO) 318b on the second receiver path 372b. The transceiver 306 may include a local oscillator (LO) 318 for each receiver path 372.

The transceiver 306 may include one or more baseband filters 352a-b, 354a-b for each receiver path 372. For example, the transceiver 306 may include a first baseband filter 352a and a second baseband filter 354a on a first receiver path 372a for filtering out certain frequencies of the first downconverted inphase/quadrature (I/Q) signal. The first baseband filter 352a and the second baseband filter 354a on the first receiver path 372a may filter out certain frequencies of the first downconverted inphase/quadrature (I/Q) signal to obtain a first filtered inphase/quadrature (I/Q) signal. The transceiver 306 may also include a first baseband filter 352b and a second baseband filter 354b on a second receiver path 372b for filtering out certain frequencies of the second downconverted inphase/quadrature (I/Q) signal. The first baseband filter 352b and the second baseband filter 354b on the second receiver path 372b may filter out certain frequencies of the second downconverted inphase/quadrature (I/Q) signal to obtain a second filtered inphase/quadrature (I/Q) signal. The transceiver 306 may include additional baseband filters 352, 354 for processing additional downconverted inphase/quadrature (I/Q) signals on additional receiver paths 372.

The transceiver 306 may include one or more transceiver upconverters 356a-b, 358a-b for each receiver path 372. In one example, a first transceiver upconverter 356a and second transceiver upconverter 358a on a first receiver path 372a may upconvert the first filtered inphase/quadrature (I/Q) signal based on a frequency of an interface local oscillator (LO) signal 338 to obtain a first upconverted inphase/quadrature (I/Q) signal. The interface local oscillator (LO) signal 338 may be generated by an interface local oscillator (LO) 320. The frequency of the interface local oscillator (LO) signal 338 may be reduced (by a factor of N1) by a first frequency divider 328a before being provided to the first transceiver upconverter 356a and the second transceiver upconverter 358a on the first receiver path 372a. The frequency of the interface local oscillator (LO) signal 338 may also be reduced (by a factor of N2) by a second frequency divider 328b before being provided to the first transceiver upconverter 356b and the second transceiver upconverter 358b on the second receiver path 372b.

The second filtered inphase/quadrature (I/Q) signal may be provided to a first transceiver upconverter 356a and a second transceiver upconverter 356b on the second receiver path 372b. The first transceiver upconverter 356b and the second transceiver upconverter 358b may upconvert the second filtered inphase/quadrature (I/Q) signal based on the frequency of the interface local oscillator (LO) signal 338 (via the second frequency divider 328b) to obtain a second upconverted inphase/quadrature (I/Q) signal. The transceiver 306 may include additional transceiver upconverters 356, 358 for upconverting additional filtered inphase/quadrature (I/Q) signals along additional receiver paths 372.

Each of the frequency dividers 328 may be used to generate a frequency that is scaled from the frequency of the interface local oscillator (LO) signal 338. By scaling the frequency of the interface local oscillator (LO) signal 338, the frequency of the interface local oscillator (LO) signal 338 provided to the transceiver upconverters 356a, 358a on the first receiver path 372a may be different than the frequency of the interface local oscillator (LO) signal 338 provided to the transceiver upconverters 356b, 358b on the second receiver path 372b. The transceiver 306 may include a different frequency divider 328 for each of the receiver paths 372 to generate upconverted inphase/quadrature (I/Q) at a different frequency for each receiver path 372. Each of the frequency dividers 328 may scale the frequency of the interface local oscillator (LO) signal 338 according to a different factor for each receiver path 372. The frequency dividers 328 may also be used to generate inphase (I) and quadrature (Q) local oscillator (LO) signals. For example, the first frequency divider 328a may generate an inphase (I) local oscillator (LO) signal to be applied to the upconverter 356a and a quadrature (Q) local oscillator (LO) signal to be applied to the upconverter 358a. The second frequency divider 328b may perform a similar function for the second receiver path 327b. In this way, the upconverters 356, 358 may function as a quadrature modulator or a single-sideband upconverter.

Each of the upconverted inphase/quadrature (I/Q) signals may be provided to a summing block 322 on the transceiver 306. The summing block 322 may combine each of the upconverted inphase/quadrature (I/Q) signals from each receiver path 372 to produce a combined inphase/quadrature (I/Q) signal 340a-b (e.g., a combined differential signal). For example, the first upconverted inphase/quadrature (I/Q) signal and the second upconverted inphase/quadrature (I/Q) signal may be provided to the summing block 322. The summing block 322 may combine each of the signals to obtain a combined inphase/quadrature (I/Q) signal 340 that includes signal bands from each of the first upconverted inphase/quadrature (I/Q) signal and the second upconverted inphase/quadrature (I/Q) signal. Therefore, the combined signal 340 includes information from each of the upconverted inphase/quadrature (I/Q) signals being processed by the transceiver 306. In some configurations, the summing block 322 may combine additional upconverted inphase/quadrature (I/Q) signals depending on the number of receiver paths 372 on the wireless device 302. In one configuration, the summing block 322 may combine up to eight inphase/quadrature (I/Q) signals into a single combined inphase/quadrature (I/Q) signal 340. Further, the combined inphase/quadrature (I/Q) signal 340 may include a combined inphase (I) signal 340a and a combined quadrature (Q) signal 340b.

The transceiver 306 may provide the combined signal 340 to the modem 308 via the analog baseband interface 384. Similar to the transceiver 306, the modem 308 may process multiple inphase/quadrature (I/Q) signals along multiple receiver paths 372. Each of the receiver paths 372 may include one or more modem downconverters 360a-b, 362a-b. For example, the modem 308 may include a first modem downconverter 360a and a second modem downconverter 362a on the first receiver path 372a. The first and second modem downconverters 360a, 362a on the first receiver path 372a may downconvert the combined inphase/quadrature (I/Q) signal 340 according to the frequency of the interface local oscillator (LO) signal 338 provided to the first modem downconverter 360a and the second modem downconverter 362a on the first receiver path 372a (via the analog baseband interface 384 and a first frequency divider 346a). The first modem downconverter 360a and the second modem downconverter 362a on the first receiver path 372a may output a first downconverted inphase/quadrature (I/Q) signal.

The third modem downconverter 360b and the fourth modem downconverter 362b on the second receiver path 372b may downconvert the combined inphase/quadrature (I/Q) signal according to the frequency of the interface local oscillator (LO) signal 338 provided to the third modem downconverter 360b and the fourth modem downconverter 362b on the second receiver path 372b (via the analog baseband interface 384 and a second frequency divider 346b). The third modem downconverter 360b and the fourth modem downconverter 362b on the second receiver path 372b may output a second downconverted inphase/quadrature (I/Q) signal.

The frequency dividers 346 may be used to scale the frequency of the interface local oscillator (LO) signal 338 provided to the modem downconverters 360, 362. For example, the first frequency divider 346a may be used to scale the frequency of the interface local oscillator (LO) signal 338 (by a factor of N1) provided to the modem downconverters 360a, 362a on the first receiver path 372a. The first frequency divider 346a on the modem 308 may scale the frequency of the interface local oscillator (LO) signal 338 using the same factor as the first frequency divider 328a on the transceiver 306. The second frequency divider 346b may also scale the frequency of the interface local oscillator (LO) signal 338 (by a factor of N2) provided to the modem downconverters 360b, 362b on the second receiver path 372b. The second frequency divider 346b on the modem 308 may scale the frequency of the interface local oscillator (LO) signal 338 using the same factor as the second frequency divider 328b on the transceiver 306. The modem 308 may include a different frequency divider 346 for each of the receiver paths 372. Each of the frequency dividers 346 on the modem 308 may scale the frequency of the interface local oscillator (LO) signal 338 using the same scaling factor as corresponding frequency dividers 328 on the transceiver 306. The frequency dividers 346 may also be used to generate inphase (I) and quadrature (Q) local oscillator (LO) signals. For example, the first frequency divider 346a may generate in inphase (I) local oscillator (LO) signal to be applied to the downconverter 360a and a quadrature (Q) local oscillator (LO) signal to be applied to the downconverter 362a. The second frequency divider 346b may perform a similar function for the second receiver path 372b. In this way, the downconverters 360, 362 may function as a quadrature modulator or a single-sideband downconverter.

Each downconverted inphase/quadrature (I/Q) signal may include a signal band centered around the baseband frequency, with any additional signal bands included within the combined inphase/quadrature (I/Q) signal 340 offset from the baseband. The signal band for each downconverted inphase/quadrature (I/Q) signal centered around the baseband frequency may correspond to the signal band of the upconverted inphase/quadrature (I/Q) signal for the corresponding receiver path 372. For example, the signal band at the baseband frequency of a first downconverted inphase/quadrature (I/Q) signal may correspond to a signal band from the first upconverted inphase/quadrature (I/Q) signal on the first receiver path 372a. Additionally, each of the baseband signal bands for each of the downconverted inphase/quadrature (I/Q) signals may correspond to the signal band from each of the upconverted inphase/quadrature (I/Q) signals on the corresponding receiver paths 372.

The modem 308 may include one or more baseband filters 364a-b, 366a-b for each receiver path 372. For example, the modem 308 may include a first baseband filter 364a and a second baseband filter 366a on the first receiver path 372a for filtering out certain frequencies of the first downconverted inphase/quadrature (I/Q) signal to obtain a first filtered inphase/quadrature (I/Q) signal. The modem 308 may also include a third baseband filter 364b and a fourth baseband filter 366b on the second receiver path 372b for filtering out certain frequencies of the second downconverted inphase/quadrature (I/Q) signal to obtain a second inphase/quadrature (I/Q) signal. Each of the baseband filters 364, 366 may be used to filter signals of the downconverted inphase/quadrature (I/Q) signals outside the baseband frequency. The modem 308 may include additional baseband filters 364, 366 for processing additional downconverted inphase/quadrature (I/Q) signals on additional receiver paths 372. Further, the combined signal 340 provided to each baseband filter 364, 366 may be present in each of the downconverted inphase/quadrature (I/Q) signals at different carrier frequencies. Each baseband filter 364, 366 may preserve the downconverted inphase/quadrature (I/Q) signal (i.e., the signal with a 0 Hz carrier frequency) and attenuate the signals at other carrier frequencies.

The modem 308 may include one or more analog to digital converters (ADCs) 368 for each receiver path 372. For example, the modem 308 may include a first analog to digital converter (ADC) 368a and a second analog to digital converter (ADC) 370a on a first receiver path 372a for converting the first filtered inphase/quadrature (I/Q) signal from the analog domain to the digital domain to obtain a converted inphase/quadrature (I/Q) signal. The modem 308 may also include a third analog to digital converter (ADC) 368b and a fourth analog to digital converter (ADC) 370b on the second receiver path 372b for converting the second filtered inphase/quadrature (I/Q) signal from the analog domain to the digital domain to obtain a second converted inphase/quadrature (I/Q) signal. The modem 308 may include additional analog to digital converters (ADCs) 368, 370 for converting additional inphase/quadrature (I/Q) signals on additional receiver paths 372. Each of the converted inphase/quadrature (I/Q) signals may be provided to other circuitry on the wireless device 302.

Interfacing between the transceiver 306 and the modem 308 may be simplified by combining various inphase/quadrature (I/Q) signals into a combined inphase/quadrature (I/Q) signal 340. For example, the transceiver 306 and the modem 308 may simultaneously process multiple inphase/quadrature (I/Q) signals on multiple receiver paths 372 while using only three pins for transferring information between the transceiver 306 and the modem 308 via the analog baseband interface 384. A first pin may be used to provide the interface local oscillator (LO) signal 338 from the transceiver 306 to the modem 308 via the analog baseband interface 384. A second pin and a third pin may be used in transferring the combined inphase/quadrature (I/Q) signal 340 from the transceiver 306 to the modem 308 via the analog baseband interface 384. In one configuration, the second pin may be used to transmit a combined inphase (I) signal 340a while the third pin is used to transmit a combined quadrature (Q) signal 340b via the analog baseband interface 384. Combining multiple upconverted inphase/quadrature (I/Q) signals becomes increasingly beneficial when using additional receiver paths 372. For example, a single receiver path 372 may include four signals within the inphase/quadrature (I/Q) signal. Thus, eight receiver paths 372 may include thirty-two signals that interface between the transceiver 306 and the modem 308 via the analog baseband interface 384. By combining these inphase/quadrature (I/Q) signals into the combined inphase/quadrature (I/Q) signal 340, the transceiver 306 and the modem 308 may be able to simultaneously process each of the thirty-two signals while using three common pins/connections between the transceiver 306 and the modem 308.

Figure 4:
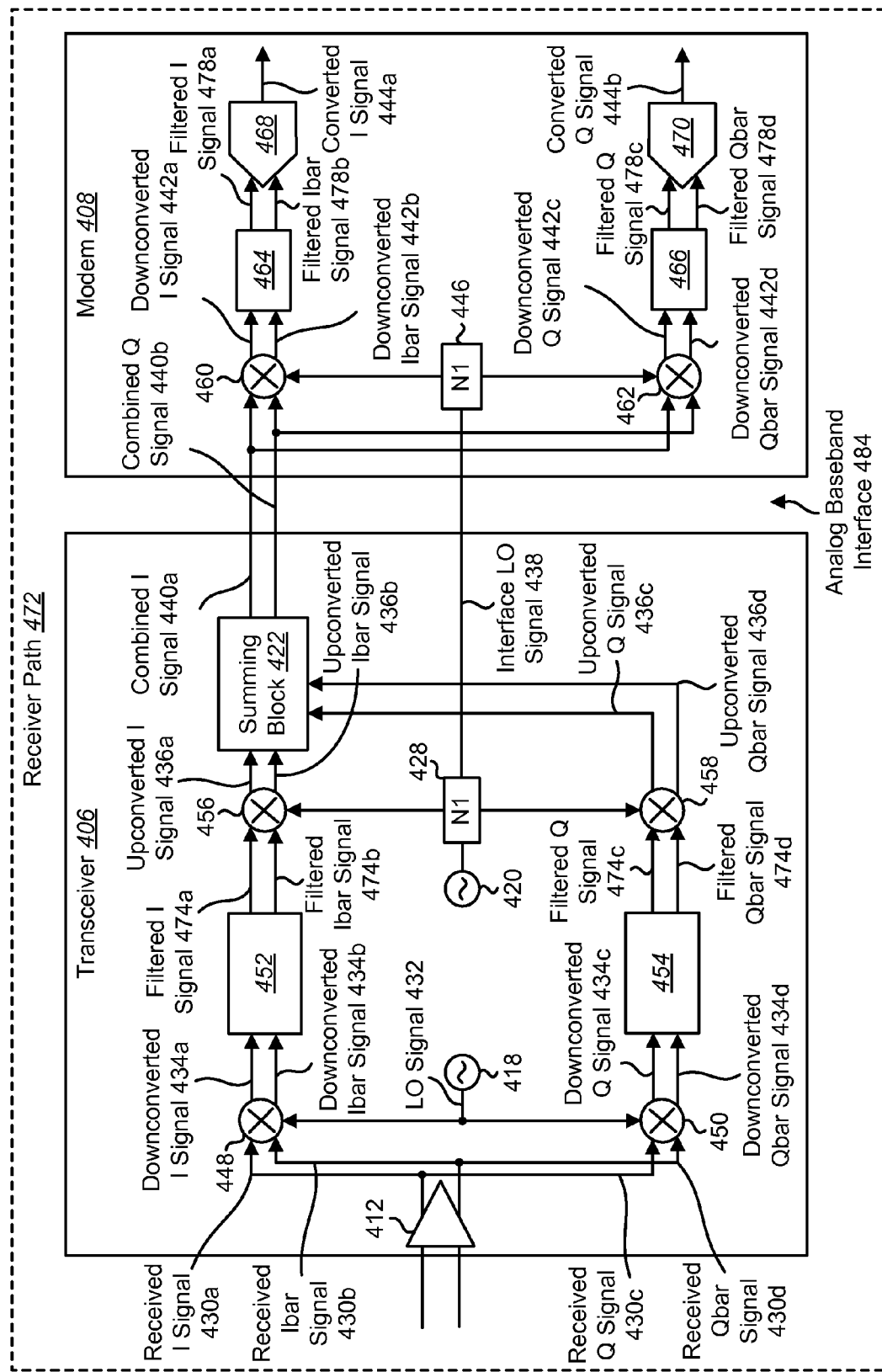
FIG. 4 is a block diagram illustrating one configuration of a receiver path for processing an inphase/quadrature (I/Q) signal on a wireless device.

FIG. 4 is a block diagram illustrating one configuration of a receiver path 472 for processing an inphase/quadrature (I/Q) signal on a wireless device 102. The receiver path 472 may be implemented using a transceiver 406, a modem 408 and an analog baseband interface 484. The transceiver 406, modem 408 and analog baseband interface 484 may be configurations of the transceiver 106, modem 108 and analog baseband interface 184 described above in connection with FIG. 1. The wireless device 102 may implement multiple receiver paths 472 for simultaneously processing multiple received inphase/quadrature (I/Q) signals 430a-d and interfacing between a transceiver 406 and a modem 408.

The transceiver 406 may receive an inphase/quadrature (I/Q) signal from a front end module 104. The transceiver 406 may include one or more low noise amplifiers (LNAs) 412 for amplifying the received inphase/quadrature (I/Q) signal and providing an amplified inphase/quadrature (I/Q) signal 430 to be processed along the receiver path 472. The amplified inphase/quadrature (I/Q) signal 430 may include a receiver inphase (I) signal 430a, a receiver inverse inphase (Ibar) signal 430b, a receiver quadrature (Q) signal 430c and a received inverse quadrature (Qbar) signal 430d. The received inphase (I) signal 430a and the received inverse inphase (Ibar) signal 430b may be provided to a first transceiver downconverter 448. The received quadrature (Q) signal 430c and the received inverse quadrature (Qbar) signal 430d may be provided to a second transceiver downconverter 450.

The first transceiver downconverter 448 and the second transceiver downconverter 450 may downconvert each of the received inphase/quadrature (I/Q) signals 430 according to the frequency of a local oscillator (LO) signal 432 provided from a local oscillator (LO) 418. Specifically, the first transceiver downconverter 448 may downconvert the received inphase (I) signal 430a and the received inverse inphase (Ibar) signal 430b to produce a downconverted inphase (I) signal 434a and a downconverted inverse inphase (Ibar) signal 434b. Each of the downconverted inphase (I) signal 434a and the downconverted inverse inphase (Ibar) signal 434b may be provided to a first baseband filter 452 on the transceiver 406.

The second transceiver downconverter 450 may downconvert the received quadrature (Q) signal 430c and the received inverse quadrature (Ibar) signal 430d to obtain a downconverted quadrature (Q) signal 434c and a downconverted inverse quadrature (Qbar) signal 434d. Each of the downconverted quadrature (Q) signal 434c and a downconverted inverse quadrature (Qbar) signal 434d may be provided to a second baseband filter 454.

The first baseband filter 452 may filter out certain frequencies of the downconverted inphase (I) signal 434a and the downconverted inverse inphase (Ibar) signal 434b to produce a filtered inphase (I) signal 474a and a filtered inverse inphase (Ibar) signal 474b. Each of the filtered inphase (I) signal 474a and the filtered inverse inphase (Ibar) signal 474b may be provided to a first transceiver upconverter 456. The second baseband filter 454 may filter out certain frequencies of the downconverted quadrature (Q) signal 434c and the downconverted inverse quadrature (Qbar) signal 434d to produce a filtered quadrature (Q) signal 474c and a filtered inverse quadrature (Qbar) signal 474d. Each of the filtered quadrature (Q) signal 474c and the filtered inverse quadrature (Qbar) signal 474d may be provided to a second transceiver upconverter 458.

The first transceiver upconverter 456 and second transceiver upconverter 458 may upconvert each of the filtered inphase/quadrature (I/Q) signals 474 according to the frequency of an interface local oscillator (LO) signal 438 provided from an interface local oscillator (LO) 420 (via a frequency divider 428). The frequency divider 428 may scale the interface local oscillator (LO) signal 438 (by a factor of N) before providing the interface local oscillator (LO) signal 438 to the transceiver upconverters 456, 458. The frequency divider 428 may also be used to produce inphase (I) and quadrature (Q) local oscillator (LO) signals.

The first transceiver upconverter 456 may upconvert the filtered inphase (I) signal 474a and the filtered inverse inphase (Ibar) signal 474b to produce an upconverted inphase (I) signal 436a and an upconverted inverse inphase (Ibar) signal 436b. Each of the upconverted inphase (I) signal 436a and the upconverted inverse inphase (Ibar) signal 436b may be provided to a summing block 422 on the transceiver 406. The second transceiver upconverter 458 may upconvert the filtered quadrature (Q) signal 474c and the filtered inverse quadrature (Qbar) signal 474d to obtain an upconverted quadrature (Q) signal 436c and an upconverted inverse quadrature (Qbar) signal 436d. Each of the upconverted quadrature (Q) signal 436c and the upconverted inverse quadrature (Qbar) signal 436d may be provided to the summing block 422.

The summing block 422 may combine each of the upconverted inphase/quadrature (I/Q) signals 436 to obtain a combined inphase/quadrature (I/Q) signal 440 (e.g., a combined differential signal). When multiple receiver paths 472 are implemented, the summing block 422 may include signal bands from multiple upconverted inphase/quadrature (I/Q) signals 436 at different frequencies based on the factor (N) used by the frequency dividers 428 for different receiver paths 472. The summing block 422 may combine each of the upconverted inphase (I) signals 436a and inverse inphase (Ibar) signals 436b to obtain a combined inphase (I) signal 430a. The summing block 422 may also combine each of the upconverted quadrature (Q) signals 436c and the upconverted inverse quadrature (Qbar) signals 436d to obtain a combined quadrature (Q) signal 440b. When multiple receiver paths 472 are used, the combined inphase (I) signal 440a may include portions of each of the upconverted inphase (I) signals 436a and the upconverted inverse inphase (Ibar) signals 436b from each of the receiver paths 472. The combined quadrature (Q) signal 440b may also include portions of each of the upconverted quadrature (Q) signals 436c and the upconverted inverse quadrature (Qbar) signals 436d from each of the receiver paths 472.

The transceiver 406 may provide the combined inphase (I) signal 440a and the combined quadrature (Q) signal 440b to the modem 408 via the analog baseband interface 484. The transceiver 406 may provide the combined inphase (I) signal 440a, including signal bands from the upconverted inphase (I) signals 436a and the upconverted inverse inphase (Ibar) signals 436b from multiple receiver paths 472, to the modem 408 using a first pin. The transceiver 406 may also provide the combined quadrature (Q) signal 440b, including signal bands from the upconverted quadrature (Q) signals 436c and the upconverted inverse quadrature (Qbar) signals 436d, to the modem 408 using a second pin. The transceiver 406 may also provide the interface local oscillator (LO) signal 438 to the modem 408 using a third pin. Therefore, the analog baseband interface 484 may be used to simultaneously process one or more received inphase/quadrature (I/Q) signals 430 along multiple receiver paths 472 using three pins coupling the transceiver 406 and the modem 408 via the analog baseband interface 484.

The combined inphase (I) signal 440a and the combined quadrature (Q) signal 440b may be distributed to a first modem downconverter 460 and a second modem downconverter 462 via the analog baseband interface 484. The first modem downconverter 460 may receive an inphase (I) signal and an inverse inphase (Ibar) signal of the combined inphase/quadrature (I/Q) signal 440. The second modem downconverter 462 may receive a quadrature (Q) signal and an inverse quadrature (Qbar) signal from the combined inphase/quadrature (I/Q) signal 440.

The first modem downconverter 460 may downconvert the inphase (I) and inverse inphase (Ibar) components of the combined inphase/quadrature (I/Q) signal 440 according to the frequency of the interface local oscillator (LO) signal 438 (via the analog baseband interface 484 and the frequency divider 446). The first modem downconverter 460 may output a downconverted inphase (I) signal 442a and a downconverted inverse inphase (Ibar) signal 442b. The second modem downconverter 462 may downconvert the quadrature (Q) and inverse quadrature (Qbar) components of the combined inphase/quadrature (I/Q) signal 440 according to the frequency of the interface local oscillator (LO) signal 438 (via the analog baseband interface 484 and the frequency divider 446). The second modem downconverter 462 may output a downconverted quadrature (Q) signal 442c and a downconverted inverse quadrature (Qbar) signal 442d.

As discussed above, the frequency of the interface local oscillator (LO) signal 438 may be scaled or multiplied using the frequency divider 446 on the modem 408. The frequency divider 446 on the modem 408 may scale the frequency of the interface local oscillator (LO) signal 438 (by a factor of N1) using the same factor as the frequency divider 428 on the transceiver 406. The frequency divider 446 may also be used to produce inphase (I) and quadrature (Q) local oscillator (LO) signals.

The first baseband filter 464 may filter out certain frequencies from the downconverted inphase (I) signal 442a and the downconverted inverse inphase (Ibar) signal 442b to obtain a filtered inphase (I) signal 478a and a filtered inverse inphase (Ibar) signal 478b. The filtered inphase (I) signal 478a and the filtered inverse inphase (Ibar) signal 478b may be provided to a first analog to digital converter (ADC) 468. The second baseband filter 466 may filter out certain frequencies from the downconverted quadrature (Q) signal 442c and the downconverted inverse quadrature (Qbar) signal 442d to obtain a filtered quadrature (Q) signal 478c and a filtered inverse quadrature (Qbar) signal 478d. The filtered quadrature (Q) signal 478c and the filtered inverse quadrature (Qbar) signal 478d may be provided to a second analog to digital converter (ADC) 470.

The first analog to digital converter (ADC) 468 may convert the filtered inphase (I) signal 478a and the filtered inverse inphase (Ibar) signal 478b to obtain a converted inphase (I) signal 444a. The second analog to digital converter (ADC) 470 may convert the filtered quadrature (Q) signal 478c and the filtered inverse quadrature (Qbar) signal 478d to obtain a converted quadrature (Q) signal 444b. The converted inphase (I) signal 444a and the converted quadrature (Q) signal 444b may be provided to other circuitry on a wireless device 102.

Figure 5:
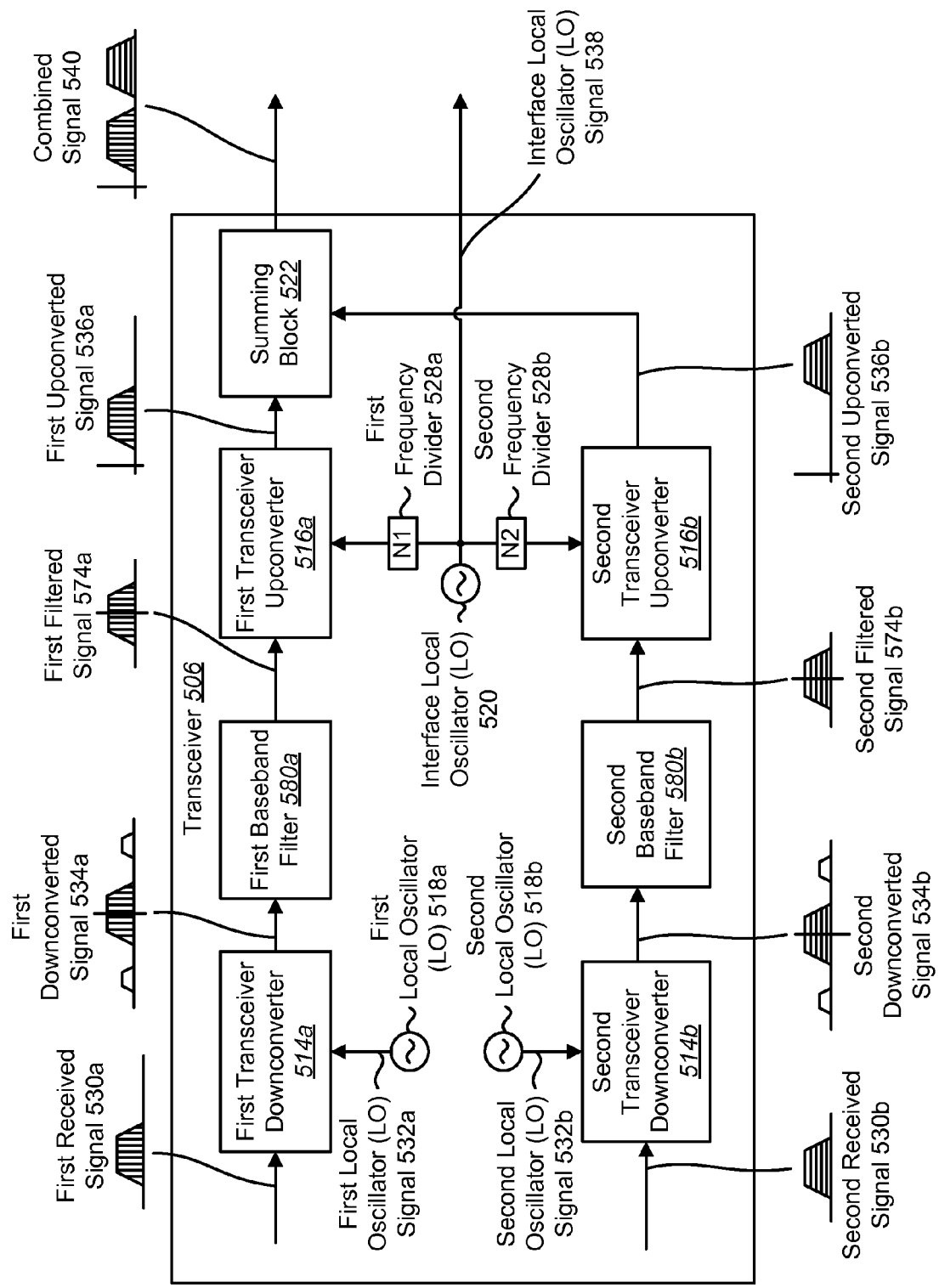
FIG. 5 is a block diagram illustrating one configuration of a transceiver.

FIG. 5 is a block diagram illustrating one configuration of a transceiver 506. The transceiver 506 may be used when implementing the analog baseband interface 184 between the transceiver 506 and a modem 108 on a wireless device 102. The transceiver 506 may be one configuration of the transceiver 106 described above in connection with FIG. 1. The transceiver 506 may receive a first received signal 530a and a second received signal 530b. The transceiver 506 may be configured to simultaneously process the first received signal 530a and the second received signal 530b along multiple receiver paths 272. The first received signal 530a may include a signal band above the baseband frequency. The frequency of the first received signal 530a may correspond to the frequency of a signal received by a first antenna 110 on the wireless device 102. The second received signal 530a may include a signal band above the baseband frequency. The frequency of the second received signal 530b may correspond to the frequency of a signal received by a second antenna 110 on the wireless device 102. Alternatively, the first received signal 530a and second received signal 530b may be received by a single antenna 110 on the wireless device 102.

The transceiver 506 may include a first transceiver downconverter 514a and a first local oscillator (LO) 518a. The first local oscillator (LO) 518a may generate a first local oscillator (LO) signal 532a. The first transceiver downconverter 514a may downconvert the first received signal 530a according to the frequency of the first local oscillator (LO) signal 532a to obtain a first downconverted signal 534a at baseband. The first downconverted signal 534a may include unwanted noise at varying frequencies along the frequency spectrum. The first downconverted signal 534a may be provided to a first baseband filter 580a.

The transceiver 506 may also include a second transceiver downconverter 514b and a second local oscillator (LO) 518b. The second local oscillator (LO) 518b may generate a second local oscillator (LO) signal 532b. The second transceiver downconverter 514b may downconvert the second received signal 530b according to the frequency of a second local oscillator (LO) signal 532b to obtain a second downconverted signal 534b at base band. The second downconverted signal 534b may include unwanted noise at varying frequencies along the frequency spectrum. The second downconverted signal 534b may be provided to a second baseband filter 580b.

The first baseband filter 580a may filter out a range of frequencies to eliminate noise and other unwanted signals from the first downconverted signal 534a. The first baseband filter 580a may provide a first filtered signal 574a to a first transceiver upconverter 516a. The first filtered signal 574a may include a baseband signal without the unwanted noise of the first downconverted signal 534a. The second baseband filter 580b may filter out a range of frequencies to eliminate noise and other unwanted signals from the second downconverted signal 534b. The second baseband filter 580b may provide a second filtered signal 574b to a second transceiver upconverter 516b. The second filtered signal 574b may include a baseband signal 580b without the unwanted noise of the second downconverted signal 534b.

The transceiver 506 may include the first transceiver upconverter 516a, the second transceiver upconverter 516b, an interface local oscillator (LO) 520 and frequency dividers 528a-b. The interface local oscillator (LO) 520 may generate an interface local oscillator (LO) signal 538. The frequency of the interface local oscillator (LO) signal 538 may be scaled (by a factor of N1) by a first frequency divider 528a before being provided to the first transceiver upconverter 516a. The first transceiver upconverter 516a may upconvert the first filtered signal 574a to produce a first upconverted signal 536a. The first upconverted signal 536a may include a signal band offset from the baseband frequency based on the scaled frequency of the interface local oscillator (LO) signal 538 provided to the first transceiver upconverter 516a (via the first frequency divider 528a). The frequency of the interface local oscillator (LO) signal 538 may also be scaled (by a factor of N2) by the second frequency divider 528b before being provided to the second transceiver upconverter 516b. The second transceiver upconverter 516b may upconvert the second filtered signal 574b to produce a second upconverted signal 536b. The second upconverted signal 536b may include a signal band offset from the baseband frequency based on the scaled frequency of the interface local oscillator (LO) signal 538 provided to the second transceiver upconverter 516b (via the second frequency divider 528b).

The transceiver 506 may combine the first upconverted signal 536a and the second upconverted signal 536b using a summing block 522 to obtain a combined signal 540 (e.g., a combined differential signal). The combined signal 540 may include the upconverted signal bands of each of the first upconverted signal 536a and the second upconverted signal 536b. Each of the signal bands from different receiver paths 272 may be offset along the frequency spectrum in the combined signal 540. The transceiver 506 may provide the combined signal 540 to a modem 108 on the wireless device 102 (via the analog baseband interface 184). The transceiver 506 may also provide the interface local oscillator (LO) signal 538 to the modem 108 (via the analog baseband interface 184).

Figure 6:
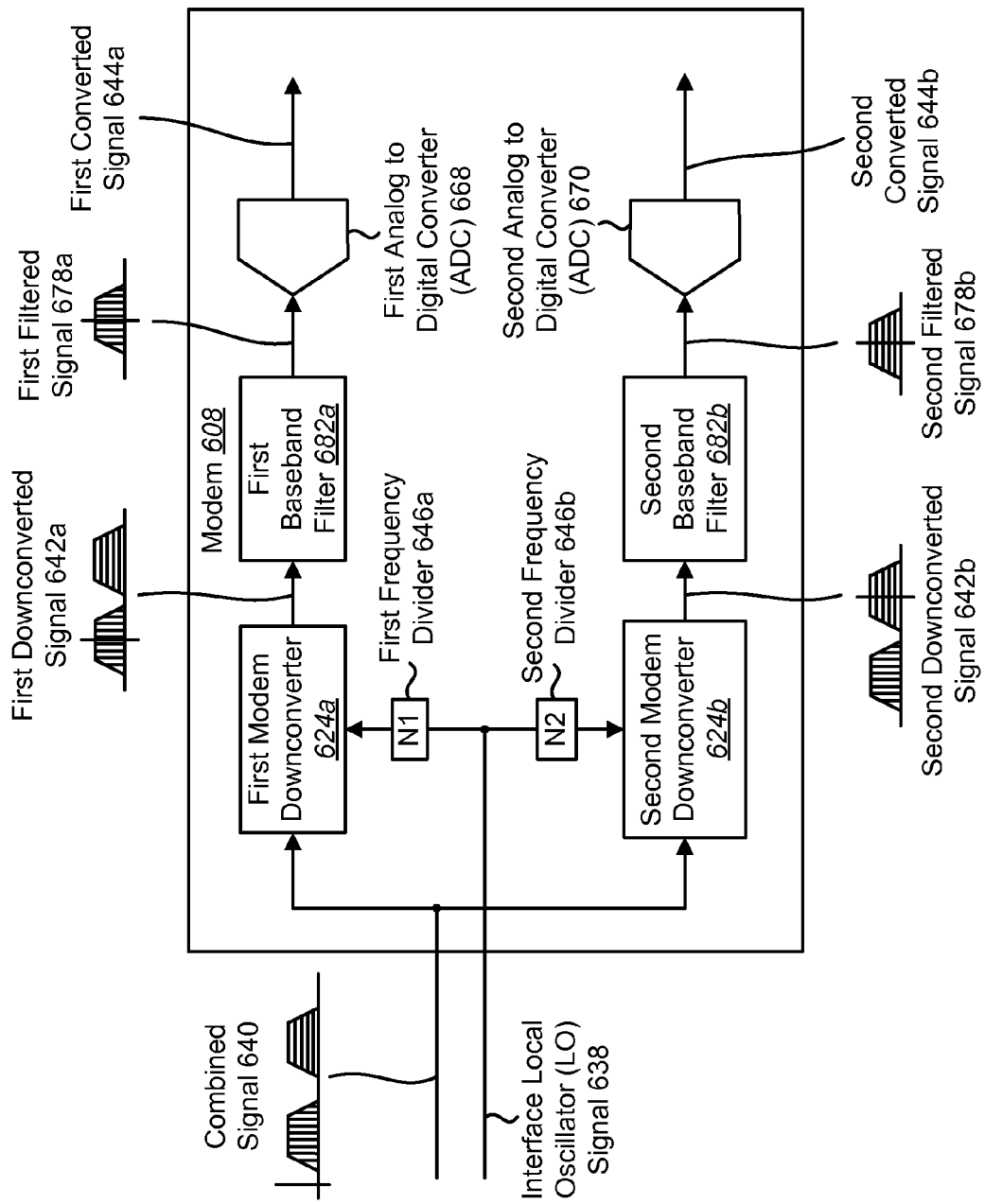
FIG. 6 is a block diagram illustrating one configuration of a modem.

FIG. 6 is a block diagram illustrating one configuration of a modem 608. The modem 608 may be used when implementing the analog baseband interface 184 between a transceiver 106 and the modem 608 on a wireless device 102. The modem 608 may be one configuration of the modem 108 described above in connection with FIG. 1. The modem 608 may receive a combined signal 640 (e.g., a combined differential signal) from a transceiver 106 via the analog baseband interface 184. The combined signal 640 may include the upconverted signal bands of each of the first upconverted signal 536a and the second upconverted signal 536b obtained by the transceiver 506. The modem 608 may also receive an interface local oscillator (LO) signal 638 from the transceiver 506 via the analog baseband interface 184. The combined signal 640 may be provided to a first modem downconverter 624a and a second modem downconverter 624b on the modem 608 to be simultaneously processed along different receiver paths 272.

The first modem downconverter 624a may downconvert the combined signal 640 according to the frequency of the interface local oscillator (LO) signal 638 provided to the first modem downconverter 624a (via the analog baseband interface 184 and a first frequency divider 646a). The first frequency divider 646a on the modem 608 may scale the frequency of the interface local oscillator (LO) signal 638 using the same factor (N1) as the first frequency divider 528a on the transceiver 506. The first modem downconverter 624a may output a first downconverted signal 642a such that the signal band within the combined signal 640 from the first upconverted signal 536a is at the baseband frequency while the signal band from the second upconverted signal 536b is offset from the baseband frequency.

The second modem downconverter 624b may downconvert the combined signal 640 according to the frequency of the interface local oscillator (LO) signal 638 provided to the second modem downconverter 624b (via the analog baseband interface 184 and a second frequency divider 646b). The second frequency divider 646b on the modem 608 may scale the frequency of the interface local oscillator (LO) signal 638 using the same factor (N2) as the second frequency divider 528b on the transceiver 506. The second modem downconverter 624b may output a second downconverted signal 642b such that the signal band within the combined signal 640 from the second upconverted signal 536b is at the baseband frequency while the signal band from the first upconverted signal 536a is offset from the baseband frequency.

The combined signal 640 may be present in each of the downconverted signals 642 at different carrier frequencies. The separation of each of the downconverted signals 642 may be performed by baseband filters 682 after each downconverter 624. Each baseband filter 682 may be configured to preserve the downconverted signal (i.e., the signal with a 0 Hz carrier frequency) and attenuate the signals at other carrier frequencies. For example, the first downconverted signal 642a may be filtered using a first baseband filter 682a to obtain a first filtered signal 678a. The first baseband filter 682a may filter out non-baseband signals from the first downconverted signal 642a such that the resulting first filtered signal 678a includes only the signal band of the first downconverted signal 642a at the baseband frequency. The second downconverted signal 642b may be filtered using a second baseband filter 682b to obtain a second filtered signal 678b. The second baseband filter 682b may filter out non-baseband signals from the second downconverted signal 642b such that the resulting second filtered signal 678b includes only the signal band of the second downconverted signal 642b at the baseband frequency.

The first filtered signal 678a may be converted from the analog to digital domain using a first analog to digital converter (ADC) 668 to obtain a first converted signal 644a. The first converted signal 644a may be a digital approximation of the first filtered signal 678a. The second filtered signal 678b may be converted from the analog to digital domain using a second analog to digital converter (ADC) 670 to obtain a second converted signal 644b. The second converted signal 644b may be a digital approximation of the second filtered signal 678b. The first converted signal 644a and the second converted signal 644b may be provided to other circuitry on the wireless device 102.

Figure 7:
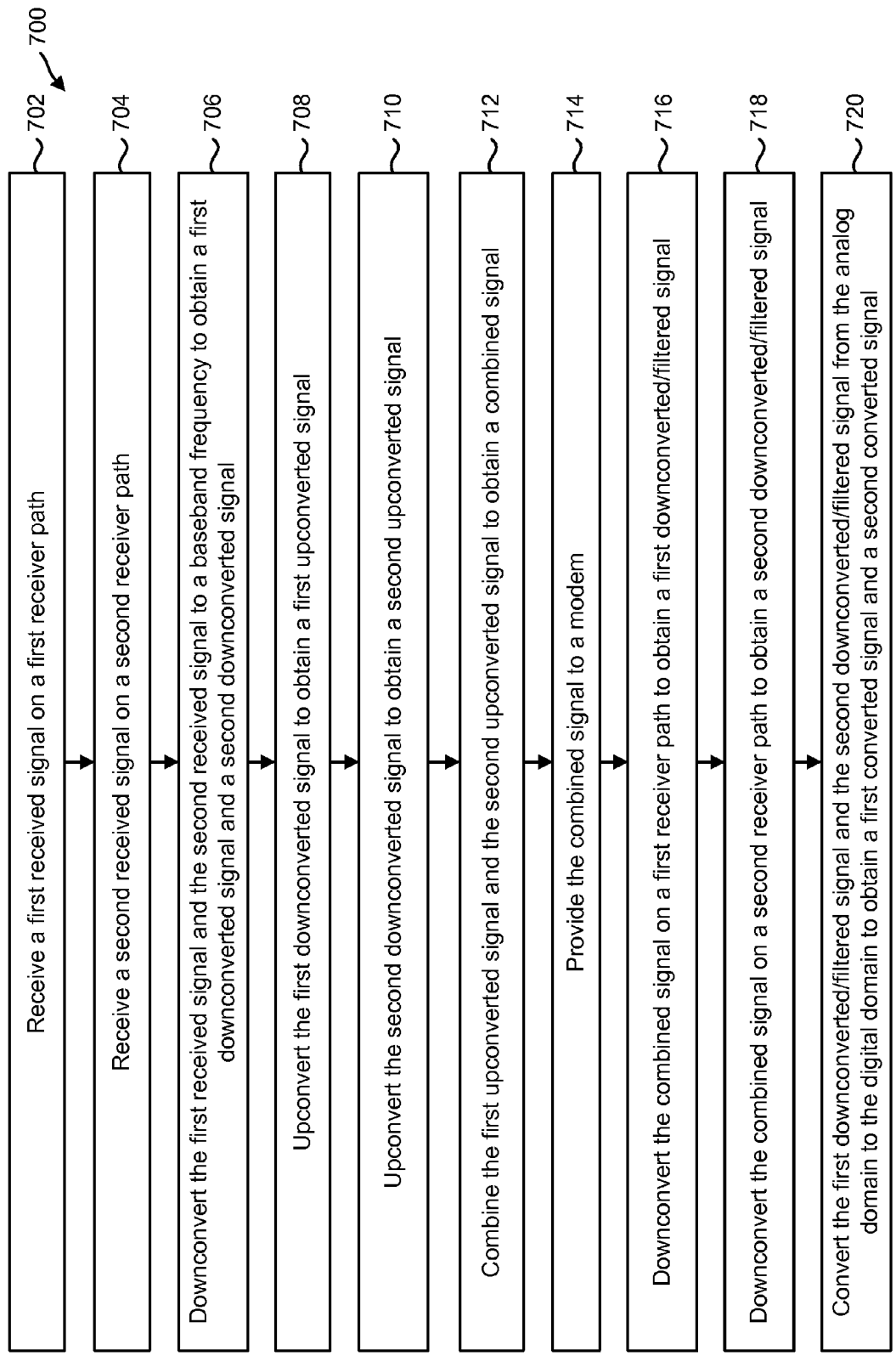
FIG. 7 is a flow diagram of a method for interfacing between a transceiver and a modem on a wireless device.

FIG. 7 is a flow diagram of a method 700 for interfacing between a transceiver 106 and a modem 108 on a wireless device 102. The method 700 may be performed by the wireless device 102. The wireless device 102 may receive 702 a first received signal 230a on a first receiver path 272a. The wireless device 102 may also receive 704 a second received signal 230b on a second receiver path 272b. The wireless device 102 may be configured to simultaneously process each of the first received signal 230a and the second received signal 230b along multiple receiver paths 272 on the wireless device 102. The wireless device 102 may include additional receiver paths 272.

The wireless device 102 may include a transceiver 106. The transceiver 106 may downconvert 706 the first received signal 230a and the second received signal 230b to a baseband frequency to obtain a first downconverted signal 234a and a second downconverted signal 234b. The transceiver 106 may downconvert the first received signal 230a according to a first local oscillator (LO) signal 232a generated by a first local oscillator (LO) 218a. The transceiver 106 may downconvert the second received signal 230b according to a second local oscillator (LO) signal 232b generated by a second local oscillator (LO) 218b. In some configurations, the transceiver 106 may include a transceiver downconverter 114 and a local oscillator (LO) 118 for each of the receiver paths 272 on the wireless device 102. The transceiver 106 may also implement one or more baseband filters 352, 354 for filtering out different signals (e.g., high frequency signals, noise) from each of the downconverted signals 234 on different receiver paths 272.

The transceiver 106 may upconvert 708 the first downconverted signal 234a using a first transceiver upconverter 216a.

The first transceiver upconverter 216a may upconvert 708 the first downconverted signal 234a to produce a first upconverted signal 236a. The first downconverted signal 234a may be upconverted according to the frequency of an interface local oscillator (LO) signal 238 provided to the first transceiver upconverter 216a (via a first frequency divider 228a). The first frequency divider 228a may scale the frequency of the interface local oscillator (LO) signal 238 (by a factor of N1) provided to the first transceiver upconverter 216a. The transceiver 106 may also upconvert 710 the second downconverted signal 234b using a second transceiver upconverter 216b. The second transceiver upconverter 216b may upconvert 710 the second downconverted signal 234b to produce a second upconverted signal 236b. The second downconverted signal 234b may be upconverted according to the frequency of an interface local oscillator (LO) signal 238 provided to the second transceiver upconverter 216b (via a second frequency divider 228b). The second frequency divider 228b may scale the frequency of the interface local oscillator (LO) signal 238 (by a factor of N2) provided to the second transceiver upconverter 216b. The frequency of the first upconverted signal 236a may be different than the frequency of the second upconverted signal 236b.

The transceiver 106 may combine 712 the first upconverted signal 236a and the second upconverted signal 23b to obtain a combined signal 240 (e.g., a combined differential signal). The first upconverted signal 236a and the second upconverted signal 236b may be combined using a summing block 122 on the transceiver 106. The combined signal 240 may include signal bands from the first upconverted signal 236a and the second upconverted signal 236b with offset frequencies. The transceiver 106 may provide 714 the combined signal 240 to a modem 108 via the analog baseband interface 184. The transceiver 106 may also provide the interface local oscillator (LO) signal 238 to the modem 108 via the analog baseband interface 184.

The modem 108 may provide the combined signal 240 to one or more modem downconverters 124 on different receiver paths 272. The modem 108 may downconvert 716 the combined signal 240 on the first receiver path 272a to obtain a first downconverted/filtered signal 242a using a first modem downconverter 224a. The first modem downconverter 224a may downconvert 716 the combined signal 240 according to the frequency of the interface local oscillator (LO) signal 238 provided to the first modem downconverter 224a (via the analog baseband interface 184 and a first frequency divider 246a). The first frequency divider 246a on the modem 108 may scale the frequency of the interface local oscillator (LO) signal 238 (by a factor of N1) using the same factor as the first frequency divider 228a on the transceiver 106.

The modem 108 may downconvert 718 the combined signal 240 on the second receiver path 272b to obtain a second downconverted/filtered signal 242b using a second modem downconverter 224b. The second modem downconverter 224b may downconvert 718 the combined signal 240 according to the frequency of the interface local oscillator (LO) signal 238 provided to the second modem downconverter 224b (via the analog baseband interface 184 and a second frequency divider 246b). The second frequency divider 246b on the modem 108 may scale the frequency of the interface local oscillator (LO) signal 238 (by a factor of N2) using the same factor as the second frequency divider 228b on the transceiver 106. The modem 108 may further implement one or more baseband filters 364, 366 for filtering out signals (e.g., non-baseband signals) from each of the downconverted/filtered signals 242 on different receiver paths 272. The baseband filters 364, 366 may be used to preserve the downconverted/filtered signals 242 while attenuating the signals at other carrier frequencies.

The modem 108 may convert 720 the first downconverted/filtered signal 242a and the second downconverted/filtered signal 242b from the analog domain to the digital domain to obtain a first converted signal 244a and a second converted signal 244b. The modem 108 may convert 720 the first downconverted/filtered signal 242a from the analog domain to the digital domain using a first analog to digital converter (ADC) 226a. The modem 108 may convert 720 the second downconverted/filtered signal 242b from the analog domain to the digital domain using a second analog to digital converter (ADC) 226b. The first analog to digital converter (ADC) 226a and the second analog to digital converter (ADC) 226b may provide each of the converted signals 244 to other circuitry on the wireless device 102.

Figure 8:
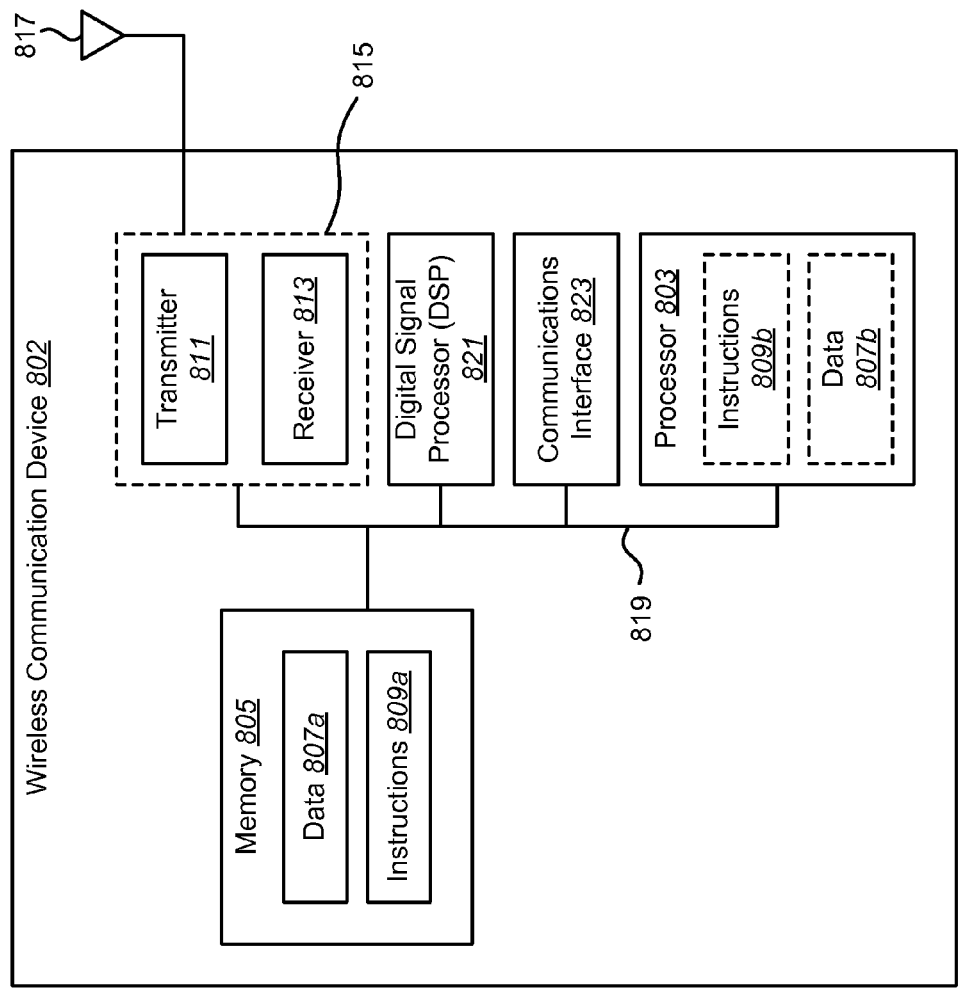
FIG. 8 illustrates certain components that may be included within a wireless communication device.

FIG. 8 illustrates certain components that may be included within a wireless communication device 802. The wireless communication device 802 may be an access terminal, a mobile station, a user equipment (UE), etc. The wireless communication device 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless communication device 802 of FIG. 8, in an alternative configuration, a combination of processors (e.g., an ARM and DSP) could be used.

The wireless communication device 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The wireless communication device 802 may also include a transmitter 811 and a receiver 813 to allow transmission and reception of signals to and from the wireless communication device 802 via an antenna 817. The transmitter 811 and receiver 813 may be collectively referred to as a transceiver 815. The wireless communication device 802 may also include (not shown) multiple transmitters, multiple antennas, multiple receivers and/or multiple transceivers.

The wireless communication device 802 may include a digital signal processor (DSP) 821. The wireless communication device 802 may also include a communications interface 823. The communications interface 823 may allow a user to interact with the wireless communication device 802.

The various components of the wireless communication device 802 may be coupled together by one or more buses, which may include a power bus, a control signal bus, a status signal bus, a data bus, etc. For the sake of clarity, the various buses are illustrated in FIG. 8 as a bus system 819.

Figure 9:
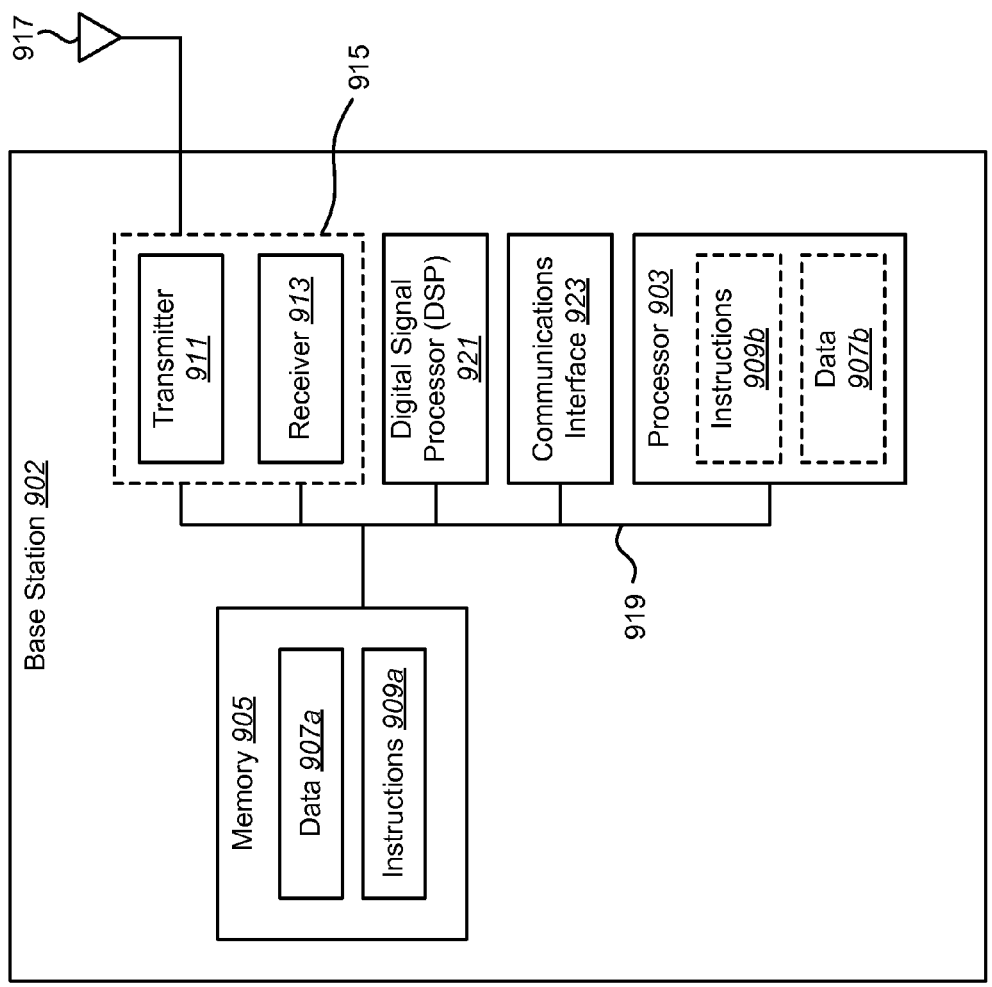
FIG. 9 illustrates certain components that may be included within a base station.

FIG. 9 illustrates certain components that may be included within a base station 902. A base station may also be referred to as, and may include some or all of the functionality of, an access point, a broadcast transmitter, a NodeB, an evolved NodeB, etc. The base station 902 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the base station 902 of FIG. 9, in an alternative configuration, a combination of processors (e.g., an ARM and DSP) could be used.

The base station 902 also includes memory 905. The memory 905 may be any electronic component capable of storing electronic information. The memory 905 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The base station 902 may also include a transmitter 911 and a receiver 913 to allow transmission and reception of signals to and from the base station 902. The transmitter 911 and receiver 913 may be collectively referred to as a transceiver 915. An antenna 917 may be electrically coupled to the transceiver 915. The base station 902 may also include (not shown) multiple transmitters, multiple receivers, multiple transceivers and/or multiple antennas.

The base station 902 may include a digital signal processor (DSP) 921. The base station 902 may also include a communications interface 923. The communications interface 923 may allow a user to interact with the base station 902.

The various components of the base station 902 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as the method illustrated by FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless device for interfacing between a transceiver and a modem, comprising:
   the transceiver coupled to receive a first received signal and a second received signal from one or more antenna, the transceiver comprising:
   a first downconverter to downconvert the first received signal to a baseband frequency;
   a second downconverter to downconvert the second received signal to the baseband frequency; and
   one or more upconverters to upconvert one or more of the first received signal and the second received signal,
   wherein the transceiver generates a combined signal comprising a first signal band from the first received signal and a second signal band from the second received signal at offset frequencies;
   an analog baseband interface that provides the combined signal from the transceiver to the modem;
   an interface local oscillator to generate an interface local oscillator signal; and
   the modem, wherein the modem generates a downconverted/filtered signal for one or more of the first and second signal bands of the combined signal,
   wherein the interface local oscillator signal is reduced by a first factor and coupled to one of said one or more upconverters in the transceiver, and wherein the interface local oscillator signal is reduced by the first factor to generate one downconverted/filtered signal in the modem.

2. The wireless device of claim 1, wherein the transceiver and the modem are configured to simultaneously process the first received signal and the second received signal along multiple receiver paths.

3. The wireless device of claim 1, wherein the first received signal and the second received signal are inphase/quadrature signals.

4. The wireless device of claim 1, wherein a first downconverted/filtered signal is generated by downconverting the combined signal to the baseband frequency for the first signal band.

5. The wireless device of claim 4, wherein a second downconverted/filtered signal is generated by downconverting the combined signal to the baseband frequency for the second signal band.

6. The wireless device of claim 1, wherein the modem converts a first downconverted/filtered signal from analog to digital using a first analog to digital converter and wherein the modem converts a second downconverted/filtered signal from analog to digital using a second analog to digital converter.

7. The wireless device of claim 1, wherein the transceiver comprises a frequency divider with a different factor for each receiver path on the wireless device.

8. The wireless device of claim 1, wherein the transceiver comprises said interface local oscillator and wherein the transceiver generates the interface local oscillator signal.

9. The wireless device of claim 8, wherein the interface local oscillator signal is provided from the transceiver to the modem over the analog baseband interface.

10. The wireless device of claim 9, wherein the combined signal and the interface local oscillator signal are provided to the modem using three common pins via the analog baseband interface.

11. The wireless device of claim 8, wherein the interface local oscillator signal is provided to a first transceiver upconverter on a first receiver path.

12. The wireless device of claim 11, wherein the frequency of the interface local oscillator signal is scaled by a first factor using a first frequency divider on the transceiver prior to being provided to the first transceiver upconverter.

13. The wireless device of claim 12, wherein the interface local oscillator signal is provided to a second transceiver upconverter on a second receiver path.

14. The wireless device of claim 13, wherein the frequency of the interface local oscillator signal is scaled by a second factor using a second frequency divider on the transceiver prior to being provided to the second transceiver upconverter.

15. The wireless device of claim 9, wherein the interface local oscillator signal is provided to a first modem downconverter on a first receiver path.

16. The wireless device of claim 15, wherein the frequency of the interface local oscillator signal is scaled by a first factor using a first frequency divider on the modem prior to being provided to the first modem downconverter, and wherein the first factor is also used for scaling the interface local oscillator signal on the first receiver path using a first frequency divider on the transceiver.

17. The wireless device of claim 16, wherein the interface local oscillator signal is provided to a second modem downconverter on a second receiver path.

18. The wireless device of claim 17, wherein the interface local oscillator signal is scaled by a second factor using a second frequency divider on the modem prior to being provided to the second modem downconverter, and wherein the second factor is also used for scaling the interface local oscillator signal on the second receiver path using a second frequency divider on the transceiver.

19. The wireless device of claim 18, wherein the modem comprises a frequency divider with a different factor for each receiver path on the wireless device.

20. The wireless device of claim 19, wherein each factor of each frequency divider on the modem corresponds to a factor of a frequency divider for the receiver path on the transceiver.

21. A method for interfacing between a transceiver and a modem, comprising:
   receiving, in a transceiver, a first received signal and a second received signal from one or more antenna;
   downconverting, in the transceiver, the first received signal to a baseband frequency;
   downconverting, in the transceiver, the second received signal to the baseband frequency;
   upconverting, in the transceiver, one or more of the first received signal and the second received signal;

generating a combined signal comprising a first signal band from the first received signal and a second signal band from the second received signal at offset frequencies;

providing the combined signal from the transceiver to the modem over an analog baseband interface; and generating a downconverted/filtered signal for one or more of the first and second signal bands of the combined signal.

22. The method of claim 21, wherein the transceiver and the modem are configured to simultaneously process the first received signal and the second received signal along multiple receiver paths.

23. The method of claim 21, wherein the first received signal and the second received signal are inphase/quadrature signals.

24. The method of claim 21, wherein a first downconverted/filtered signal is generated by downconverting the combined signal to the baseband frequency for the first signal band.

25. The method of claim 24, wherein a second downconverted/filtered signal is generated by downconverting the combined signal to the baseband frequency for the second signal band.

26. The method of claim 21, further comprising:
converting a first downconverted/filtered signal from analog to digital using a first analog to digital converter; and
converting a second downconverted/filtered signal from analog to digital using a second analog to digital converter.

27. The method of claim 21, wherein the transceiver comprises a frequency divider with a different factor for each receiver path on a wireless device.

28. The method of claim 21, further comprising generating an interface local oscillator signal on the transceiver.

29. The method of claim 28, further comprising providing the interface local oscillator signal from the transceiver to the modem over the analog baseband interface.

30. The method of claim 29, wherein the combined signal and the interface local oscillator signal are provided to the modem using three common pins via the analog baseband interface.

31. The method of claim 28, wherein the interface local oscillator signal is provided to a first transceiver upconverter on a first receiver path.

32. The method of claim 31, further comprising scaling the frequency of the interface local oscillator signal by a first factor using a first frequency divider on the transceiver prior to being provided to the first transceiver upconverter.

33. The method of claim 32, wherein the interface local oscillator signal is provided to a second transceiver upconverter on a second receiver path.

34. The method of claim 33, further comprising scaling the frequency of the interface local oscillator signal by a second factor using a second frequency divider on the transceiver prior to being provided to the second transceiver upconverter.

35. The method of claim 29, wherein the interface local oscillator signal is provided to a first modem downconverter on a first receiver path.

36. The method of claim 35, further comprising scaling the frequency of the interface local oscillator signal by a first factor using a first frequency divider on the modem prior to being provided to the first modem downconverter, and wherein the first factor also used for scaling the interface local oscillator signal on the first receiver path using a first frequency divider on the transceiver.

37. The method of claim 36, wherein the interface local oscillator signal is provided to a second modem downconverter on a second receiver path.

38. The method of claim 37, further comprising scaling the interface local oscillator signal by a second factor using a second frequency divider on the modem prior to being provided to the second modem downconverter, and wherein the second factor is also used for scaling the interface local oscillator signal on the second receiver path using a second frequency divider on the transceiver.

39. The method of claim 38, wherein the modem comprises a frequency divider with a different factor for each receiver path on a wireless device.

40. The method of claim 39, wherein each factor of each frequency divider on the modem corresponds to a factor of a frequency divider for the receiver path on the transceiver.

41. A computer-program product for interfacing between a transceiver and a modem, the computer-program product comprising a non-transitory computer-readable medium having instructions thereon, the instructions comprising:
code for configuring the transceiver to receive a first received signal and a second received signal from one or more antenna;
code for causing the transceiver to downconvert the first received signal to a baseband frequency;
code for causing the transceiver to downconvert the second received signal to the baseband frequency;
code for causing the transceiver to upconvert one or more of the first received signal and the second received signal;
code for causing a wireless device to generate a combined signal comprising a first signal band from the first received signal and a second signal band from the second received signal at offset frequencies;
code for causing the wireless device to provide the combined signal from the transceiver to the modem over an analog baseband interface; and
code for causing the wireless device to generate a downconverted/filtered signal for one or more of the first and second signal bands of the combined signal.

42. The computer-program product of claim 41, wherein the transceiver and the modem are configured to simultaneously process the first received signal and the second received signal along multiple receiver paths.

43. The computer-program product of claim 41, wherein the first received signal and the second received signal are inphase/quadrature signals.

44. The computer-program product of claim 41, wherein the instructions further comprise code for causing the wireless device to generate an interface local oscillator signal on the transceiver.

45. The computer-program product of claim 44, wherein the instructions further comprise code for causing the wireless device to provide the interface local oscillator signal from the transceiver to the modem over the analog baseband interface.

46. An apparatus for interfacing between a transceiver and a modem; comprising
means for receiving, in the transceiver, a first received signal and a second received signal from one or more antenna;
means for downconverting, in the transceiver, the first received signal to a baseband frequency;
means for downconverting, in the transceiver, the second received signal to the baseband frequency;
means for upconverting, in the transceiver, one or more of the first received signal and the second received signal;

means for generating a combined signal comprising a first signal band from the first received signal and a second signal band from the second received signal at offset frequencies;

means for providing the combined signal from the transceiver to the modem; and means for generating a downconverted/filtered signal for one or more of the first and second signal bands of the combined signal.

47. The apparatus of claim 46, wherein the means for providing the combined signal comprises an analog baseband interface.

48. The apparatus of claim 47, wherein the transceiver and the modem are configured to simultaneously process the first received signal and the second received signal along multiple receiver paths.

49. The apparatus of claim 47, wherein the first received signal and the second received signal are inphase/quadrature signals.

* * * * *